(12) United States Patent
Tatsuno

(10) Patent No.: US 7,697,762 B2
(45) Date of Patent: Apr. 13, 2010

(54) DOCUMENT LIGHTING UNIT, IMAGE SCANNING UNIT, AND IMAGE FORMING APPARATUS

(75) Inventor: Hibiki Tatsuno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1302 days.

(21) Appl. No.: 11/169,782

(22) Filed: Jun. 30, 2005

(65) Prior Publication Data
US 2006/0007417 A1    Jan. 12, 2006

(30) Foreign Application Priority Data
Jun. 30, 2004    (JP) ............................. 2004-194811
Jun. 30, 2004    (JP) ............................. 2004-194822

(51) Int. Cl.
G06K 9/46     (2006.01)
G06K 15/00    (2006.01)

(52) U.S. Cl. .................. 382/190; 382/317; 358/2.1

(58) Field of Classification Search .......... 382/100, 382/102, 112, 113, 135, 136, 137, 138, 139, 382/140, 162, 168, 181–189, 199, 232, 255, 382/274, 276, 290, 305, 321; 358/481, 461, 358/2.1; 359/204; 347/133; 235/454; 250/208.1
See application file for complete search history.

(56) References Cited

U.S. PATENT DOCUMENTS 5,399,850 A * 3/1995 Nagatani et al. ......... 250/208.1
6,141,118 A * 10/2000 Yamawaki et al. .......... 358/481
6,459,520 B1 * 10/2002 Takayama ................... 359/204
6,796,502 B2 * 9/2004 Nogami et al. .............. 235/454
6,975,338 B2 * 12/2005 Hirai et al. ................... 347/133
7,206,102 B2 * 4/2007 Fukumoto et al. ........... 358/461

FOREIGN PATENT DOCUMENTS

| JP | 63-197369 | 12/1988 |
| JP | 09-050510 | 2/1997 |
| JP | 2001-111777 | 4/2001 |
| JP | 06-022087 | 1/2004 |
| JP | 3659770 | 3/2005 |
| JP | 2005-252646 | 9/2005 |

* cited by examiner

Primary Examiner—Seyed Azarian
(74) Attorney, Agent, or Firm—Oblon, Spivak, McClelland, Maier & Neustadt, L.L.P.

(57) ABSTRACT

An image forming apparatus which includes an image forming unit and an image scanning unit. The image forming unit includes a document-contact face, a light-source unit which arrays a plurality of light-emitting elements in the main scanning direction with a pitch to emit light beams to the document-contact face, and a light-guiding member which is provided between the light-source unit and the document-contact face and guides the light beams from the plurality of light-emitting elements to the document-contact face. The light-guiding member has a length in the main scanning direction which is defined with the pitch of the plurality of light-emitting elements, and lengths of the document-contact face and the light-source unit in the main scanning direction.

20 Claims, 25 Drawing Sheets

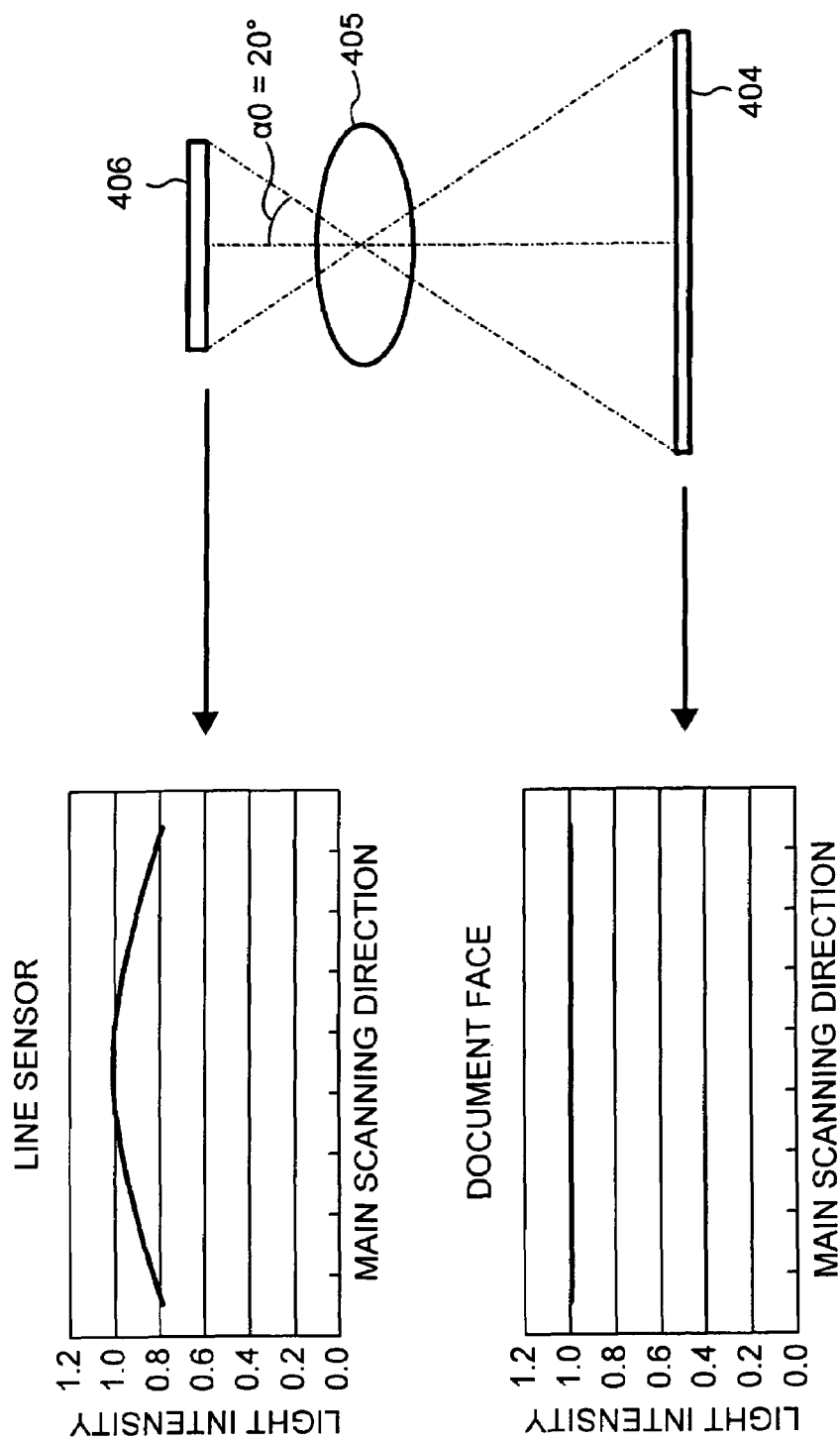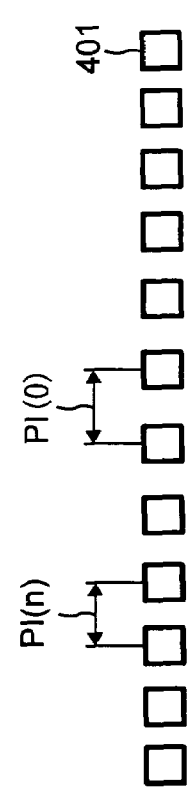
FIG. 8
FIG. 9

DOCUMENT LIGHTING UNIT, IMAGE SCANNING UNIT, AND IMAGE FORMING APPARATUS

BACKGROUND OF THE INVENTION

1. Field of the Invention

The following disclosure relates generally to a document lighting unit and an image scanning unit for use in an image processing apparatus.

2. Description of the Background Art

Increased development activities on a light emitting diode (hereinafter referred as an "LED") have led to a development of an LED element having an increased light intensity.

A typical LED element has favorable properties such as longer lifetime, higher efficiency, and monochromatic light (i.e., emitting of light energy within a very narrow wavelength band), which can be applied in a variety of lighting applications. Applications using an LED element include a document lighting unit for use in an image scanning unit provided in an image forming apparatus such as a digital copier and image scanner.

FIG. 1 shows a schematic view of an image forming apparatus 1000 including an image scanning unit. As shown in FIG. 1, the image forming apparatus 1000 includes an image forming section 100 and an image scanning section 200.

The image forming section 100 includes an image carrying member 111 in drum-shape, a charge roller 112 for charging the image carrying member 111, a developing unit 113, a transfer roller 114, a cleaning unit 115, a fixing unit 116, a light scanning unit 117, a feed cassette 118, a pair of registration rollers 119, a feed roller 120, a transport route 121, an ejection roller 122, and an ejection tray 123.

The charge roller 112 can be a corona charger, for example.

The feed cassette 118 stores a transfer sheet "S" and is detachable from the image forming section 100.

The light scanning unit 117 scans a surface of the image carrying member 111 with a laser beam (LB) based on document information transmitted from the image scanning section 200 so that an electrostatic latent image can be written on the image carrying member 111.

The image forming apparatus 1000 conducts an image forming as now described.

The image carrying member 111 made of a photoconductive material rotates in a clockwise direction, with an uniform angular velocity. During such rotation, the charge roller 112 charges the surface of the image carrying member 111 uniformly. Then, the light scanning unit 117 scans the surface of the image carrying member 111 with the laser beam LB to write an electrostatic latent image on the image carrying member 111.

The electrostatic latent image on the image carrying member 111 is developed by the developing unit 113 as a toner image with toners.

The transfer sheet S stored in an upper most position of the feed cassette 118 is fed to the feed roller 120, and an edge of the transfer sheet S is sandwiched by the pair of registration rollers 119. The pair of registration rollers 19 feeds the transfer sheet S to a transfer position, defined by the image carrying member 111 and the transfer roller 114, to transfer the toner image to the transfer sheet S by synchronizing a sheet feed timing of the transfer sheet S to the transfer position. The transfer sheet S receives the toner image from the image carrying member 111 at the transfer position by an operation of the transfer roller 114. Then, the transfer sheet S is fed to the fixing unit 116 to fix the toner image on the transfer sheet S, and is then ejected to the ejection tray 123 via the transport route 121 and the ejection roller 122.

After transferring the toner image, the surface of the image carrying member 111 is cleaned by the cleaning unit 115 to remove deposits such as toners and paper powders.

As shown in FIG. 1, the image scanning section 200 includes a contact glass 201, a first moving unit 203 having a first mirror 203a, a second moving unit 204 having a second mirror 204a and a third mirror 204b, a focus lens 205, and a line sensor 206.

As shown in FIG. 1, the first moving unit 203, the second moving unit 204, the focus lens 205, and the line sensor 206 are provided under the contact glass 201, for example.

When a document 202 is placed on the contact glass 201, a lighting device (not shown) provided to the first moving unit 203 illuminates the document 202.

A reflection light from the document 202 reflects at the first mirror 203a in the first moving unit 203, and then reflects at the second mirror 204a and the third mirror 204b in the second moving unit 204, and then goes to the focus lens 205, and focuses on the line sensor 206. The line sensor 206 functions as a photoelectric converter and conducts image scanning in main scanning direction.

As shown in FIG. 1, when scanning a document, the first moving unit 203 moves in a direction shown by an arrow with a velocity of V, and the second moving unit 204 simultaneously moves in the same direction with a velocity of ½ V to scan the document, wherein the velocity of ½ V is one half speed of the velocity of V.

To illuminate a document, a document lighting unit of an image scanning unit generally has a width which is substantially the same as a document width. Therefore, when LED elements are used for a document lighting unit, a plurality of LED elements are arranged in an array manner.

Although the LED element has favorable properties as above-mentioned, a further improvement is required for light intensity of the LED element so that the LED element can efficiently supply light intensity for a lighting device of an image scanning unit.

Therefore, an image scanning unit employing LED elements is mainly marketed as a low-speed scanning unit and compactness-oriented scanning unit, for example, whereas an image scanning unit employing a cathodoluminescent lamp is mainly marketed as a high-speed scanning unit and large-scale scanning unit.

FIGS. 2A and 2B show a background configuration for illumination. Such a configuration includes LEDs 101, a contact glass 102, and a document-contact face 103.

In FIG. 2A, a dotted-curve line represents a light intensity distribution of each LED element 101 in the main scanning direction, and a solid-curve line represents a light intensity distribution which synthesizes the light intensity distribution of each LED element 101 in the main scanning direction. In FIG. 2B, a solid-curve line represents a light intensity distribution of LED element 101 in the sub-scanning direction.

To decrease the above-mentioned drawback (i.e., light intensity) of LED element 101, an LED array is placed in a position which is closer to the document-contact face 103 to increase light intensity on the document-contact face 103, for example. However, such positioning leads to an uneven light intensity distribution in the main scanning direction as shown in FIG. 2A because of an effect of a light intensity distribution curve of the each LED element 101.

On the other hand, if the LED array is placed in a position which is far from the document-contact face 103, a light intensity on the document-contact face 103 may decrease because of diffusion of lights coming from each LED element 101.

In another case, a number of LED elements 101 is increased to increase a number density of the LED elements 101 in the LED array having a width which is substantially the same as the document width. In this case, the LED array emits light in a similar manner of a cathodoluminescent lamp, which is a bar-shaped light source.

However, light intensity distribution in the main scanning direction becomes uneven when such a bar-shaped light source is used. Specifically, light intensity around the center portion of the bar-shaped light source becomes a maximum strength, and light intensity decreases from the center portion to the edge portion of the bar-shaped light source.

This is caused by a so-called shading effect. Specifically, the shading effect occurs because an effective number of LED elements 101 that contribute to the light intensity around the center portion of the document-contact face is larger than an effective number of LED elements 101 that contribute to the light intensity around the edge portion of the document-contact face 103. In other words, the center portion of the document-contact face 103 receives light from two directions in the main scanning direction (i.e., right and left direction with respect to the center portion), but the edge portion of the document-contact face 103 receives light from only one direction.

Furthermore, the focus lens 205 is provided in the image scanning section 200 as shown in FIG. 1, and thereby a drop of light intensity at a peripheral area on the line sensor 206 becomes more significant with an effect of the fourth-power-of-cosine law.

To cope with the above-mentioned drawbacks, a background art uses a lighting unit which can uniformly conduct an efficient illumination by providing a light-guiding member having a substantially plate-shape.

In this case, at least one diffraction grating is attached to a face of the light-guiding member to achieve a uniform distribution of the light intensity in the main scanning direction. However, such a configuration having a diffraction grating on the light-guiding member (i.e., a transparent member) leads to an increase of a manufacturing cost. Furthermore, such a configuration may not cope with a drop of light intensity at a peripheral area which is associated to a focus lens.

Another background art uses a shading correction plate to cope with a drop of light intensity at a peripheral area. However, such a configuration leads to an increase in the number of parts.

Still another background art uses a configuration that slants an LED array with respect to a to-be-scanned document to cope with a drop of light intensity at a peripheral area. However, such a configuration may lead to a larger mechanism, and may not increase the light intensity.

FIGS. 3A and 3B show a configuration for illumination using a bar-shaped light source in a background art. Such a configuration includes a bar-shaped light source 301 such as a cathodoluminescent lamp, mirror-face members 302 or 302*a*, a document-contact face 303, wherein the mirror-face members 302 or 302*a* are shaped in a semi-cylindrical shape having a concaved mirror portion, and the document-contact face 303 contacts with a document to be scanned. A curve line 304 shows a light intensity distribution in a sub-scanning direction on the document-contact face 303. As shown in FIGS. 3A and 3B, the mirror-face members 302 or 302*a* reflects light emitted from the bar-shaped light source 301. The background art uses the bar-shaped light source 301 and the mirror-face member 302 or 302*a* to achieve an adequate light intensity distribution by illuminating document-contact face 303 broadly or by a combination of a plurality of planes in the mirror-face member 302 or 302*a*.

As shown in FIGS. 3A and 3B, the background art increases light intensity by reflecting lights emitted from the bar-shaped light source 301 at the mirror-face member 302 or 302*a* shaped in a semi-cylindrical shape and focusing such lights on the document-contact face 303.

The semi-cylindrical shape includes an opening portion and a cross-sectional shape expressed by a quadric curve such as a circle, ellipse, parabola, and hyperbola, and has a length which is substantially the same as a length of the bar-shaped light source 301 or a length of the document-contact face 303 in the main scanning direction.

FIG. 4 shows a schematic configuration of a light-receiving element included in an image processing apparatus such as a digital copier and image scanner. FIG. 4 shows a configuration of a focus lens 305 and a light-receiving element 306.

As shown in FIG. 4, in the image processing apparatus such as a digital copier and image scanner, a light reflected from the document is received by the light-receiving element 306 via the focus lens 305. The light-receiving element 306 includes a CCD (charge coupled device), for example, and has a width of from 0.05 to 0.1 mm, which is relatively smaller. In case of a 1:1 image focusing, only the above-mentioned small area having the above-mentioned width can be scanned on the document-contact face 303.

When the light from the light source is focused sharply, the focused light has a relatively smaller focused area. Under such a condition, if the lighting unit cannot maintain an adequate lighting position due to some factors such as deviation of a mirror angle from an adequate angle, the light intensity distribution curve line deviates from its adequate position. This may result in a significant change of the light intensity to be received by the light-receiving element 306, and consequently may affect an image to be produced.

Although FIG. 4 shows a case using a 1:1 image sensor, similar constrains can be observed for a reduction optical system. For example, if an image size is reducingly focused on the light-receiving element 306 to one tenth of an image size on the document-contact face 303, a width of image size on the document-contact face 303 is only about 1 mm, for example. Therefore, the above-described drawback on the light intensity deviation may be also observed.

FIGS. 5A, 5B, 5C, and 5D show relationships between a change of light intensity distribution curve line and a scanning area.

FIGS. 5A and 5B show cases in which a width of the light intensity distribution curve line is relatively small, and FIGS. 5C and 5D show cases in which a width of the light intensity distribution curve line is relatively large. The term "relatively" is used because the width of the light intensity distribution curve line is compared with the width of the scanning area.

FIGS. 5A and 5C show cases in which an illumination is conducted under a normal condition. In case of a digital copier, the light receiving element 306 has a smaller width such as 0.1 mm, for example. Therefore, as shown in FIG. 5B, if the center portion of the light intensity distribution curve line deviates from the scanning area, the light intensity at the scanning area may decrease significantly.

Accordingly, as for an image forming apparatus (e.g., a digital copier and image scanner), a document lighting unit, which has the light intensity distribution curve line having a larger span in the sub-scanning direction as shown in FIGS. 5C and 5D, is preferred to maintain the light intensity at the scanning area at a stable level even if the center portion of the scanning area deviates from the original position.

Specifically, a light intensity distribution curve line preferably has a flat portion around a peak of the light intensity distribution curve (i.e., portions having less unevenness of the light intensity).

In a background art, a first width required for scanning (e.g., approximately 1 mm) and a second width required for coping with a mechanical error (e.g., at least ±1 mm deviation is set for an effective scanning area) is combined and set as a minimum length to secure a flat portion around a peak of the light intensity distribution. The flat portion of the light intensity distribution is not strictly limited to a design value which can be defined by determining a mechanical configuration. The flat portion of the light intensity distribution can include some variation of the light intensity within a practicably permissible range that can be compensated with an electrical correction method, for example.

When the image forming apparatus is used for processing a monochrome image, for example, a variation of the light intensity of about 30% is permissible. When the image forming apparatus is used for processing a color image, the above-mentioned variation of the light intensity is permissible around 12% to maintain a balance of the three primary colors within a correctable range.

As above-mentioned, a background art uses a lighting unit which can uniformly conduct an efficient scanning by providing a light-guiding member having a substantially plate-shape. In this case, as above-mentioned, at least one diffraction grating is attached to reflecting faces to achieve a uniform distribution of the light intensity in the main scanning direction.

However, such a configuration having a diffraction grating on a transparent member leads to an increase of a manufacturing cost. Furthermore, such a configuration may not produce a flat portion in the light intensity distribution in the sub-scanning direction if an arrangement is not maintained appropriately.

SUMMARY OF THE INVENTION

The present disclosure relates to an image forming apparatus which includes an image forming unit and an image scanning unit. The image forming unit includes a document-contact face, a light-source unit which arrays a plurality of light-emitting elements in the main scanning direction with a pitch to emit light beams to the document-contact face, and a light-guiding member which is provided between the light-source unit and the document-contact face and guides the light beams from the plurality of light-emitting elements to the document-contact face. The light-guiding member has a length in the main scanning direction which is defined with the pitch of the plurality of light-emitting elements, lengths of the document-contact face, and the light-source unit in the main scanning direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a schematic view for explaining a drop of light intensity at a peripheral area on a line sensor;

FIG. 9 is a schematic view explaining pitches of LED elements in a light-source unit;

DETAILED DESCRIPTION OF THE PREFERRED EMBODIMENTS

Figure 1:
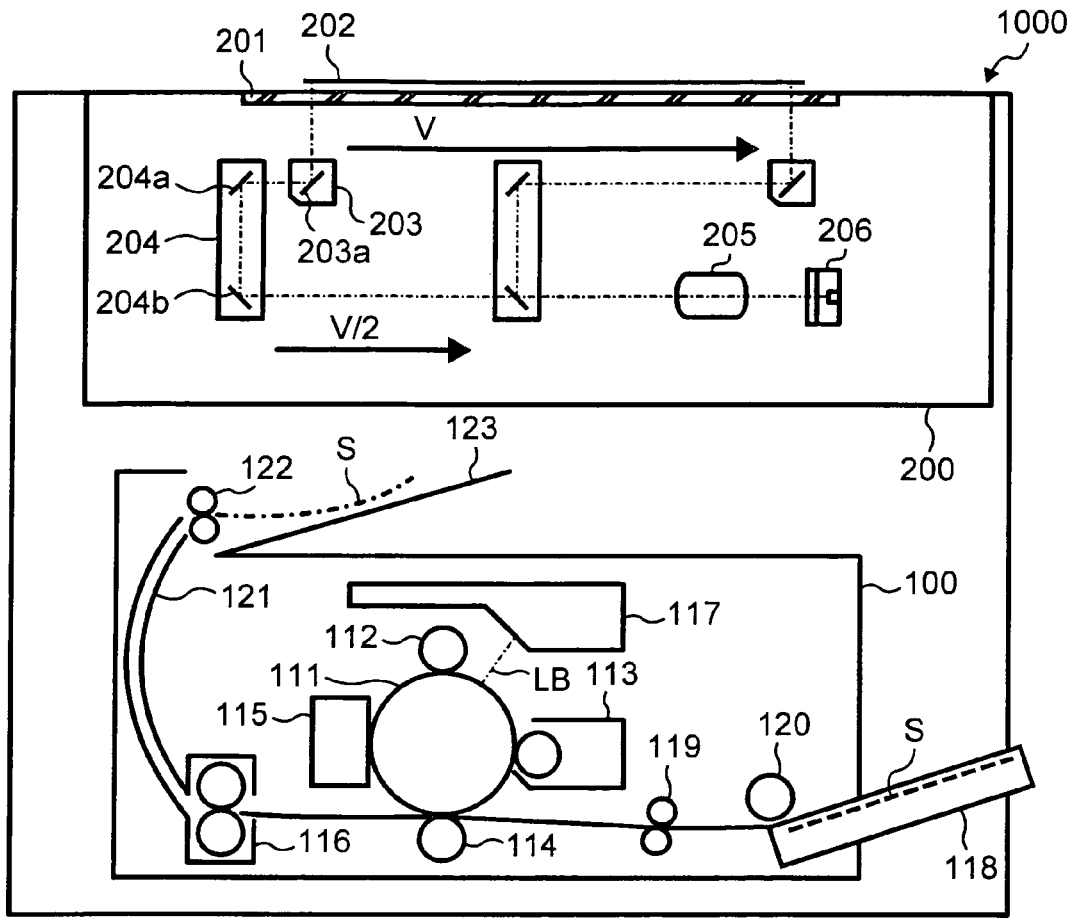
FIG. 1 is a schematic view of an image forming apparatus having an image scanning unit.

In describing example embodiments illustrated in the drawings, specific terminology is employed for the sake of clarity. However, the disclosure of this present invention is not intended to be limited to the specific terminology so selected and it is to be understood that each specific element includes all technical equivalents that operate in a similar manner.

Figure 6A:
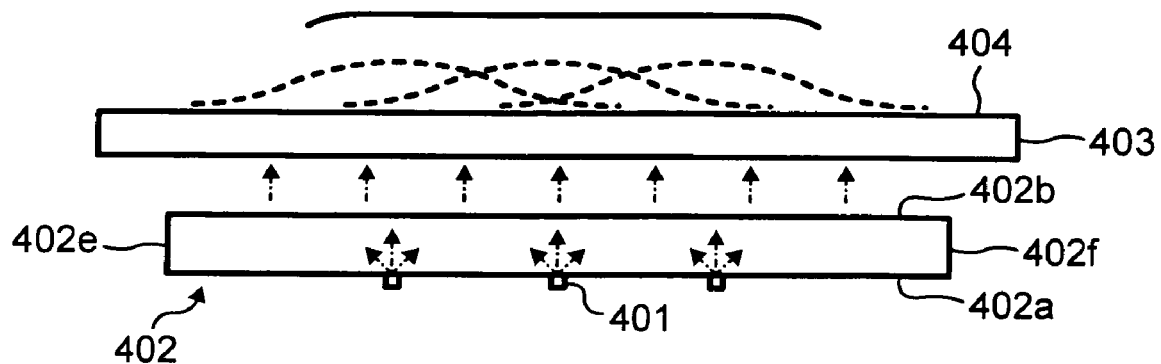
FIGS. 6A to 6C show a schematic configuration for illumination according to an example embodiment of the present invention.
Figure 6B:
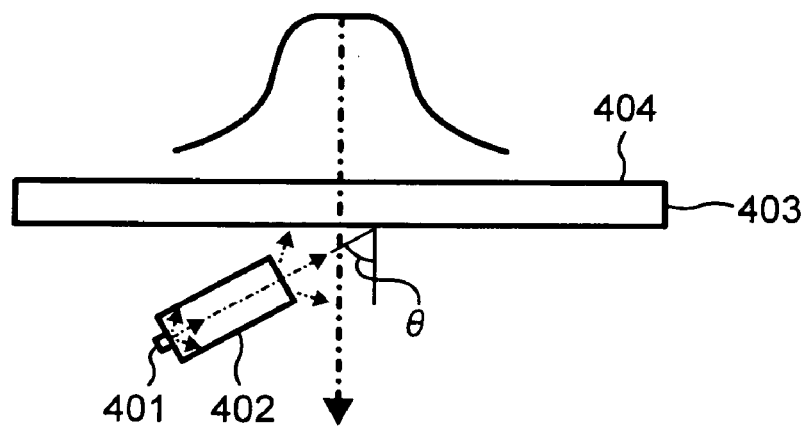

Referring now to the drawings, wherein like reference numerals designate identical or corresponding parts throughout the several views, and more particularly to FIGS. 6A and 6B thereof, an illumination configuration according to one example embodiment of the present invention is described.

Figure 6C:
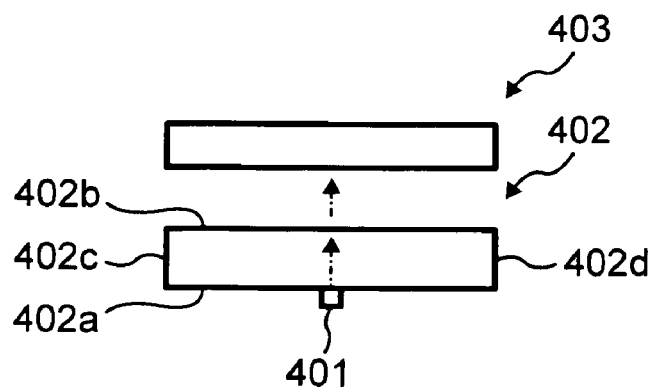

FIGS. 6A, 6B, and 6C show schematic views of an illumination configuration viewed from a main scanning direction and a sub-scanning direction.

As shown in FIGS. 6A and 6B, the illumination configuration includes LED elements 401, a light-guiding member 402, a contact glass 403, and a document-contact face 404.

As shown in FIG. 6B, when viewing the LED element 401, the light-guiding member 402, the contact glass 403, and the document-contact face 404 from the sub-scanning direction for the document-contact face 404, the LED element 401 emits a primary light beam which passes through a center of the light-guiding member 402 straightly and enters the contact glass 403 with an angle θ.

Accordingly, such angle θ is referred as an angle formed between the light-guiding member 402 and the contact glass 403 hereinafter, as required.

In FIG. 6A, a dotted curve line represents a light intensity distribution of each LED element 401 in the main scanning direction, and a solid curve line represents a light intensity distribution which synthesizes the light intensity distribution of each LED element 401 in the main scanning direction. In FIG. 6B, a solid curve line represents a light intensity distribution of the LED element 401 in the sub-scanning direction.

A lighting unit according to an example embodiment of the present invention can be used for an image scanning unit of an image forming apparatus and a digital laboratory, for example.

An image scanning is conducted in the main scanning direction and in the sub-scanning direction.

The image scanning in the sub-scanning direction can be conducted by moving a lighting unit or by moving a document, for example. Therefore, the lighting unit requires a certain length that can scan a document in the main scanning direction of the document-contact face 404.

Accordingly, an area to be illuminated by the lighting unit includes a first length in the main scanning direction and a second length in the sub-scanning direction. Such a second length in the sub-scanning direction may be a pixel width used for a line sensor, or a combined width including a pixel width and a pixel pitch between each pixel when a multicolor scanning function is provided.

The second length in the sub-scanning direction can be changed according to a shape of line sensor and a reduction rate of a reduction optical system. In a practical manner, the second length in the sub-scanning direction can be set within a range from 1 to 3 mm, for example.

A length of the document-contact face 404 can be chosen according to a size of a document. For example, if the document is A4-size format, a maximum length of the document-contact face 404 is 210 mm. If the document is A3 size, a maximum length of the document-contact face 404 is 297 mm. If the document is a photograph, a maximum length of the document-contact face 404 is 90 mm.

A longer side of the document-contact face 404 is defined as a main scanning direction, and a shorter side of the document-contact face 404 is defined as a sub-scanning direction.

The light-guiding member 402 has a rectangular solid shape (i.e., plate shape), and has a side which has a substantially same length with the document-contact face 404 in the main scanning direction. The light-guiding member 402 includes six faces 402a, 402b, 402c, 402d, 402e, 402f as shown in FIGS. 6A and 6C.

A light beam from each LED element 401 enters the light-guiding member 402 from the face 402a with an angle. Such light beams reflect between the faces 402c and 402d before outgoing from the face 402b of the light-guiding member 402. In this case, the faces 402c and 402d functions as reflection faces. The faces 402e and 402f also function as reflection faces as described later.

The light-guiding member 402 is preferably made of a transparent member such as glass or resinous material. Furthermore, the light-guiding member 402 can be made in a hollow shape (i.e., having an internal space) as described later.

A plurality of LED elements 401 can be arranged in an array having a certain length. Light-emitting planes of the LED elements 401 arranged in the LED array faces the face 402a of the light-guiding member 402.

As shown in FIG. 6C, the LED element 401 is positioned at a center between the two faces 402c and 402d. The light-emitting plane of the LED element 401 can be contacted to the face 402a, or can be distanced from the face 402a, as required. The faces 402c and 402d may be parallel to each other, in general. However, the faces 402c and 402d may not be parallel to each other, as required. Regardless of a parallel or un-parallel relationship of the faces 402c and 402d, the LED element 401 is positioned at a center between the two faces 2c and 2d.

The LED array can be made by attaching the LED elements 401 to a circuit board (not shown) having a LED-drive circuit by a soldering method. Such an LED array can be used as a light-source unit.

Light beams entering the light-guiding member 402 propagate in light-guiding member 402 in the main scanning direction, and the light beams reach the faces 402e and 402f and reflect at the faces 402e and 402f. Furthermore, the light beams entering the light-guiding member 402 reflect at the faces 402c and 402d in the sub-scanning direction according to an incidence angle of the light beam, and are output from the face 402b.

A light beam in the sub-scanning direction enters the contact glass 403 as if the light source (i.e., LED element) shifts its position to the face 402b of the light-guiding member 402. In other words, the light source (i.e., LED element) virtually comes to a position which is closer to the document-contact face 404. Therefore, a drop of light intensity on the document-contact face 404 can be reduced.

Figure 7A:
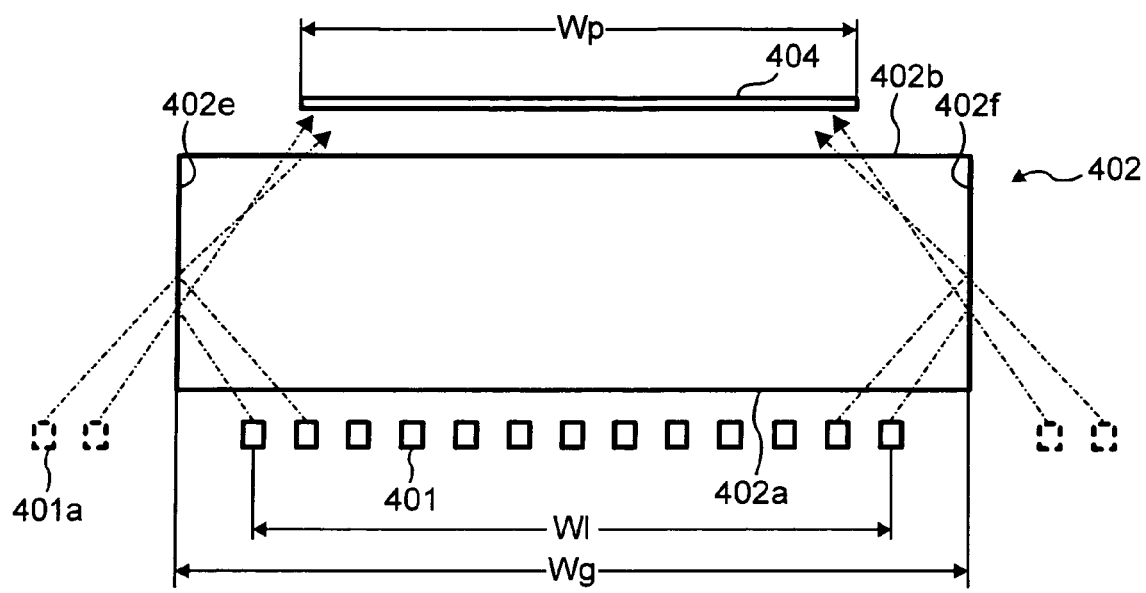
FIGS. 7A and 7B show a schematic view explaining a relationship of a length of a light-source unit, a light-guiding member, and a document-contact face.
Figure 7B:
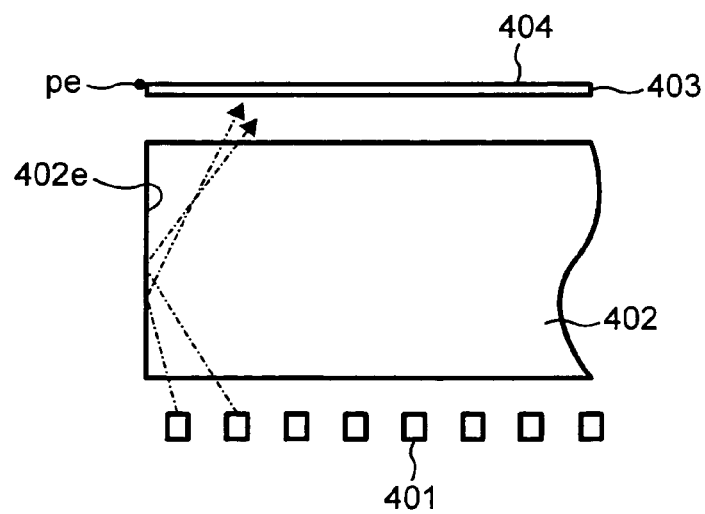

FIGS. 7A and 7B are a schematic view explaining a relationship of a length of a light-source unit (i.e., LED array), a length of the light-guiding member 402, and a length of the document-contact face 404.

In FIG. 7A, a length W1 of the light-source unit is a distance between one LED element 401 at one end portion of the light-source unit (i.e., LED array) and another LED element 401 at other end portion of the light-source unit (i.e., LED array).

A length Wg of the light-guiding member 402 is a length of the light-guiding member 402 in the main scanning direction.

A document-contact face length Wp of the document-contact face 404 is a length of the document-contact face 404 in the main scanning direction.

As above-explained, when an illumination is conducted in a conventional manner, a drop of light intensity may happen at both edge portions of the document-contact face 404 in the main scanning direction by the shading effect.

To reduce the shading effect, the faces 402e and 402f of the light-guiding member 402 can be formed as reflection faces so that the edge portion of the document-contact face 404 can be illuminated from two directions with respect to the main scanning direction (i.e., right and left direction with respect to the edge portion of the document-contact face 404). By providing the faces 402e and 402f, an LED element's virtual image (i.e., virtual-light-source) 401a can be considered to exist on a position extended from the end portion of the LED array as shown in FIG. 7A.

Therefore, it can be considered that a number of LED elements that illuminate the edge portion of the document-contact face 404 has virtually increased in the main scanning direction. Accordingly, a difference of light intensity distribution between the center portion of the document-contact face 404 and the edge portion of the document-contact face 404 can be reduced.

If the document-contact face 404 and the light-guiding member 402 can contact closely (i.e., without any gap between them) each other, a loss of light may not arise.

However, the document-contact face 404 and the light-guiding member 402 cannot contact closely each other in an actual condition.

Hereinafter, a case that the length Wg of the light-guiding member 402 and the length Wp of the document-contact face 404 have a same length is considered.

In such a case, as shown in FIG. 7B, the edge portion of the document-contact face 404 cannot not receive a light beam from the face 402e because the light beam coming from the LED array that reflects at the face 402e cannot reach the edge portion of the document-contact face 404. Thus, a drop of light intensity may arise around the edge portion of the document-contact face 404.

When the length Wg of the light-guiding member 402 is set to larger than the length Wp of the document-contact face (i.e., Wg>Wp) as shown in FIG. 7A, the above-mentioned drawback can be reduced.

For example, assume that a number of LED elements required to maintain the light intensity at a position "p" on the document-contact face 404 within a permissible range is "n" when viewing the main scanning direction of the LED array from the position "p" on the document-contact face 404. And assume that viewing one side of the main scanning direction of the LED array from an edge portion "pe" of the document-contact face 404, and count a number of LED elements 401 and the virtual-light-source 401a that can be seen to an outer side in the main scanning direction with respect to the edge portion "pe," in which the outer side is a side which is closer to the face 402e.

If the number of LED elements that can be seen on the face 402e is "n" or greater, a variation of the light intensity at the "pe" can be maintained within a permissible range, wherein the face 402e is assumed to have a reflection rate of 100%. The number of "n" can be changed according to a LED pitch "Pl" for adjacent LED elements 401.

To simplify an explanation, it is assumed that the light-guiding member 402 is made of hollow type having an internal space.

When a distance from the LED element 401 to the document-contact face 404 is set as "L0" (not shown), a distance from the outgoing plane of the light-guiding member 402 to the document-contact face 404 is set as "L1" (not shown), and a length-difference of Wg and Wp at the one edge side is set as "Df" (not shown), a proportional relationship as below can be established.

$$Df = (L1/L0) \times n \times P$$

The "n" can be obtained from a contribution rate by conducting simulations.

Figure 7C:
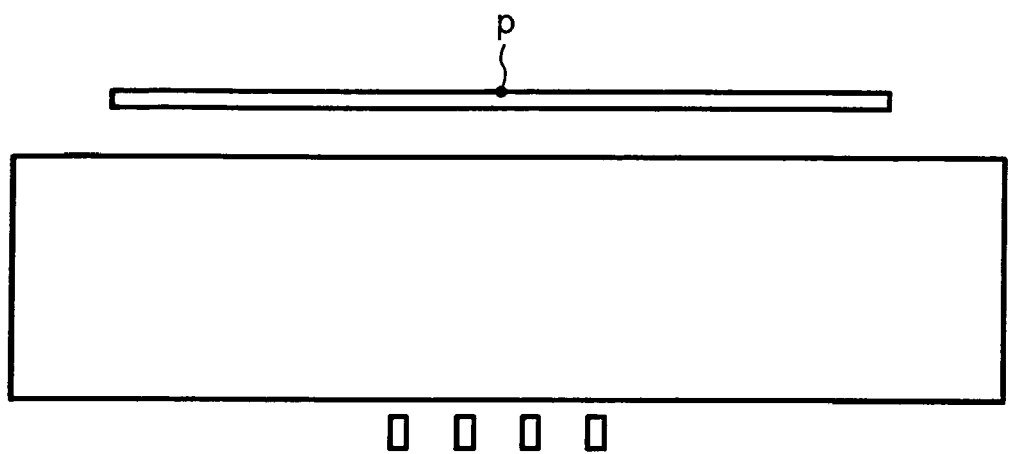
FIGS. 7C and 7D show schematic views explaining a number of LED elements that contribute to a light intensity at a point on a document-contact face.
Figure 7D:
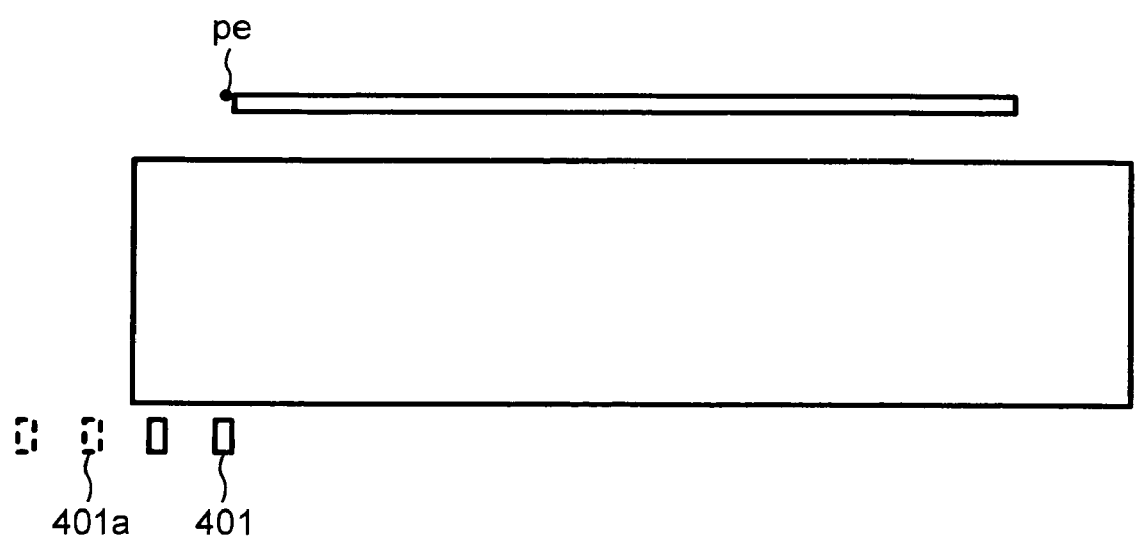

FIGS. 7C and 7D show schematic views that explain a number of LED elements contributing to a light intensity at a position on the document-contact face 404.

In FIG. 7C, it is assumed that a concerned point "p" is in a middle portion of the document-contact face 404. In this case, the number of LED elements 401 that contribute to a light intensity at the position "p" is four, for example.

In FIG. 7D, it is assumed that a point "pe" is at the edge of the document-contact face 404. In this case, the number of LED elements 401 that contribute to a light intensity at the position "pe" is two. However, as shown in FIG. 7D, two virtual-light-sources 401a also contribute to the light intensity at the position "pe" because the two virtual-light-sources 401a can be observed on positions extended from the end portion of the LED array as above described.

When the length Wg of the light-guiding member 402 is set to be longer than the length Wp of the document-contact face 404 (i.e., Wg>Wp), a consideration should be given to a length of W1 of the light-source unit (i.e., LED array).

Preferably, the LED elements 401 may be arranged in a manner that the LED elements 401 and the virtual-light-source 401a can be arranged with a same pitch and without disruption between the LED element 401 and the virtual light source 401a. Therefore, each of the faces 402e and 402f (i.e., reflection faces) of the light-guiding member 402 is preferably set to a position which comes at each end portion of the LED array, or is distanced from the end portion of the LED array by a half length of the LED pitch as shown in FIG. 7A.

However, from the viewpoint of effective usage of the LED element 401, it is not favorable to place the faces 402e and 402f to the position which comes at the end portion of the LED array.

In view of the above-described considerations, a flowing relationship can be established.

$Wp<Wg$, and $W1<Wg<W1+Pl$

To decrease a drop of the light intensity at the edge portion of the document-contact face 404, which is caused by an effect of the fourth-power-of-cosine law to be described later, each of the faces 402e and 402f may be placed to a position which has a distance to the end portion of the LED array by less than one-half of the LED pitch. Such an arrangement may contribute to a decrease in the light intensity drop when the reflection rate of 100% is not guaranteed for the faces 402e and 402f.

FIG. 8 explains a drop of light intensity at a peripheral area on a line sensor (i.e., photoelectric converter). FIG. 8 shows a schematic view of an optical configuration, a light intensity distribution on a document face, and a light intensity distribution on a line sensor (i.e., photoelectric converter).

As shown in FIG. 8, the optical configuration includes a focus lens 405 and a line sensor 406. The line sensor 406 functions as a photoelectric converter and conducts image scanning in main scanning direction.

Assume that the document-contact face 404 is uniformly illuminated as shown in FIG. 8, and an image is focused on the line sensor 406 by the focus lens 405.

In such a case, even if an aperture efficiency is maintained at a level of 100%, a light intensity of a position "X" (not shown) on the line sensor 406 is decreased with respect to a light intensity of the center position of the line sensor 406 in accordance with the fourth-power-of-cosine law, wherein the position "X" has an angle of "α0" with respect to an optical axis. The light intensity of the position "X" decreases proportionally with the fourth-power-of-cosine"α0."

Therefore, a light intensity at an edge portion of the line sensor (i.e., photoelectric converter) is proportional to the fourth-power-of-cosine"α0", wherein the "α0" is a half angle for the focus lens 405.

As shown in FIG. 8, when the half angle "α0" is set to 20°, for example, a light intensity at the edge portion of the line sensor (i.e., photoelectric converter) is decreased about 22% with respect to a light intensity at the center portion of the line sensor (i.e., photoelectric converter).

A drop rate of the light intensity at a peripheral area on the line sensor 406 (i.e., photoelectric converter) may have a variety of values according to types of the focus lens 405 because a change of angle of view may lead to a change of aperture efficiency.

As above-mentioned, each of the faces 402e and 402f of the light-guiding member 402 may be placed to a position which has a distance to the end portion of the LED array by less than one-half of the LED pitch. Such a configuration may reduce an effect of the fourth-power-of-cosine law.

However, the faces 402e and 402f effect only an area neighboring to the edge portions of the document-contact face 404, but may not effect sufficiently to cope with a drop of the light intensity which occurs overall in the main scanning direction.

In view of such a situation, an example embodiment of the present invention uses a method that differentiates light-emitting intensity of each LED element 401 according to positions of each LED element 401 in the LED array. Specifically, the closer to the end portion of the LED array, the stronger the setting of light-emitting intensity of the LED element 401.

As described with respect to FIG. 8, when the half angle is 20° and the aperture efficiency is 100%, the light intensity at the edge portion on the line sensor 406 drops about 22%. Therefore, an increase of light intensity for 22% for the LED element 401 corresponding to the edge portion of the document-contact face 404 with respect to a light intensity for the LED element 401 located at the center portion of the document-contact face 404 may be sufficient to compensate for the drop of the light intensity at the edge portion of document-contact face 404.

However, in an actual case, the light intensity at the edge portion of the document-contact face 404 does not drop for 22% with respect to the light intensity at the center portion of the document-contact face 404. In an actual case, the center portion of the document-contact face 404 receives a light beam from the LED element 401 at the center portion of the LED array and other light beams from other LED elements 401 of the LED array, and the edge portion of the document-contact face 404 receives a light beam from the LED element 401 at the end portion of the LED array and other light beams from other LED elements 401 of the LED array.

Therefore, a ratio between the light intensity at the center portion of the document-contact face 404 and the light intensity at the edge portion of the document-contact face 404 is determined based on an integrated value of the light intensity at the center portion of the document-contact face 404 and an integrated value of the light intensity at the edge portion of the document-contact face 404. Based on a result obtained by a model simulation, light intensity at the edge portion of the document-contact face 404 is smaller than the light intensity at the center portion of the document-contact face 404 by less than 22%.

Furthermore, a consideration is required for the light intensity because an aperture efficiency of 100% may not be expected for the focus lens 405.

Based on the results obtained from model simulations using a variety of conditions, a preferable relationship is obtained as follows.

Specifically, the light intensity of an LED element 401 at the center portion of the LED array is set as I(0), the light intensity of an LED element 401 at the n-th position in the main scanning direction of the LED array is set as I(n), wherein the "n" is 1 or greater (i.e., n≧1), and an LED element 401 at the end portion of the LED array is set as a maximum number (referred to as "nmax") in the LED array.

A preferable relationship for the light intensity for the LED elements 401 satisfy the following conditions.

$I(n) \geq I(n-1)$, and $I(n\max) < 4 \times I(0)$

FIG. 9 is a schematic view explaining pitches between adjacent LED elements 401 in a LED array, wherein reference character "PI" represents a pitch between adjacent LED elements.

In an example embodiment, the closer to the end portion of the LED array, a pitch between adjacent LED elements is made smaller to increase the light intensity at the edge portion and its neighboring area of the document-contact face 404.

As shown in FIG. 9, a pitch between the LED element 401 at the center portion and its adjacent LED element 401 is set as PI(0), and a pitch between an LED element 401 locating at a n-th position from the LED element 401 at the center portion and its adjacent LED element 401 is set to PI(n), wherein the "n" is 1 or greater (i.e., n≧1).

In an example embodiment, the LED elements 401 satisfy a following relationship.

$$PI(n-1) \geq PI(n)$$

Although the pitch "PI(n)" can be made smaller, constraints exist on the pitch "PI(n)" when packing LED elements 401 in a high-density manner. Such constraints include an LED element size, heat effect, and circuit configuration.

As above-described, the closer to the end portion of the LED array, a number density of LED elements 401 is set to a greater value along the main scanning direction to increase the light intensity at a peripheral area of the LED array compared with the light intensity at the center portion of the LED array so that the light intensity distribution on the document-contact face 404 can be made uniform.

Hereinafter, common conditions for Examples 1 to 10 according to embodiments of the present invention are set as below. The following Examples are conducted based on simulation models by changing parameters.

Common Conditions For Examples 1 to 10

LED:
  Output: 1 W per one element
  Light distribution: Lambert distribution
  Light-emitting face: 0.5 mm×0.5 mm (uniform emitting)
  Distance between light-emitting face and light-guiding member: 0.1 mm Contact Glass:
  Thickness: 3.2 mm
  Material: BK7 (nd=1.517)

Light-Guiding Member:
  Material: BK7 (nd=1.517)
  Angle to contact glass: 40°
  Distance between light-guiding member and contact glass: 7 mm Example 1

Example 1 has following conditions.
LED:
  Number: 11
  Pitch: 5 mm
  Light-source unit length: Wl=50 mm Document-Contact Face:
  Length (main scanning direction): Wp=41 mm
  Width (sub-scanning direction): 31 mm Light-Guiding Member:
  Length (main scanning direction): Wg=65 mm
  Thickness: 1 mm
  Width (length in optical axis direction): 8 mm
  Face 402c and 402d: mirror face (reflection rate 100%)
  Face 402e and 402f: no reflection (normal transparent face)

Figure 10A:
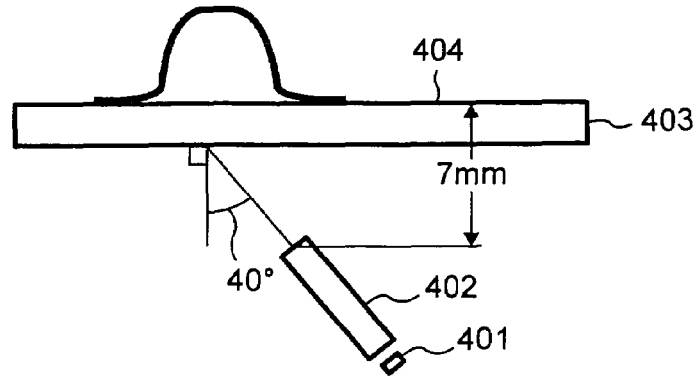
FIG. 10A is a schematic view for an illumination configuration according to an Example 1.
Figure 10B:
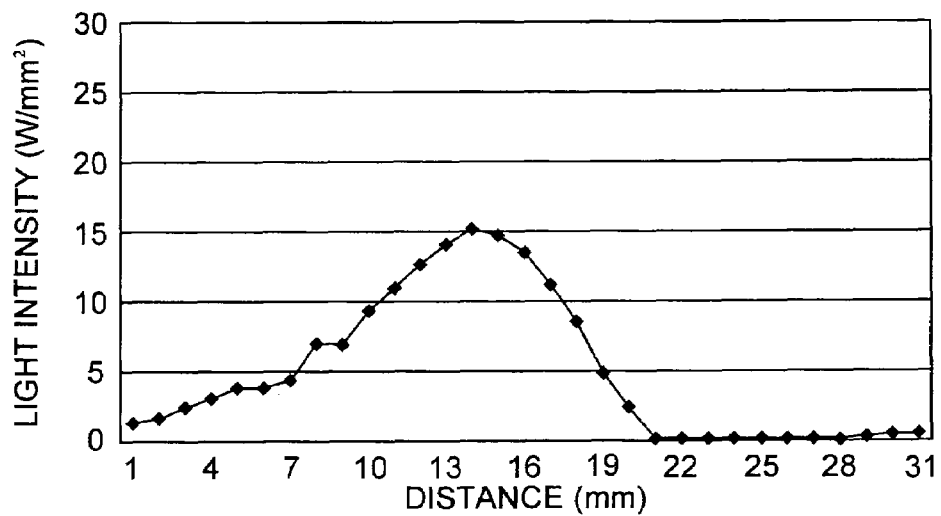
FIG. 10B is a graph for light intensity distribution in a sub-scanning direction for Example 1.
Figure 10C:
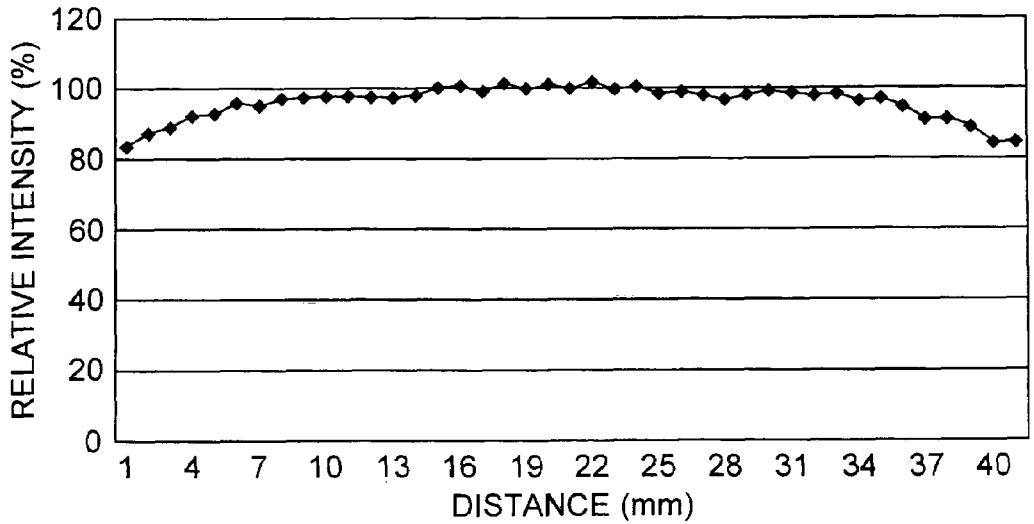
FIG. 10C is a graph for light intensity distribution in a main scanning direction for Example 1.

FIG. 10A shows a schematic view of an illumination configuration according to an example embodiment. FIGS. 10B and 10C show the light intensity distribution for Example 1. FIG. 10B shows the light intensity distribution in the sub-scanning direction for Example 1, and FIG. 10C shows the light intensity distribution in the main scanning direction for Example 1.

A calculation of the light intensity distribution with the following conditions: light beams of one million emitted from LED elements, a weighting factor is assigned to each of the LED elements, a document-contact face having an area of 41 mm×31 mm is divided in meshes (1×1 mm). A number of light beams entered in a mesh is defined as the light intensity for the mesh.

The light intensity distribution in the sub-scanning direction is measured along a center line of the document-contact face 404, and a position where the light intensity in the sub-scanning direction becomes a maximum value is determined.

A main scanning direction, which includes such a position having the maximum value in the sub-scanning direction, is used for measuring the light intensity distribution in the main scanning direction.

Light intensity distributions in the main scanning direction and the sub-scanning direction to be described later in the following Examples are measured in a similar manner. Accordingly, the light intensity distribution in the sub-scanning direction are omitted for following Examples.

In Example 1, the faces 402e and 402f of the light-guiding member 402 are non-reflection faces, and thereby a drop of light intensity is observed around the edge portion on the document-contact face 404 in the main scanning direction. The light intensity around the edge portion on the document-contact face 404 drops for about 15% with respect to the light intensity of the center portion on the document-contact face 404.

A monochrome image forming apparatus can tolerate about 30% of light intensity drop, and thereby Example 1 can be used in the monochrome image forming apparatus without drawbacks.

In Example 1, if a 2 mm-width area from the edge portion of the document-contact face 404 is not used, Example 1 can be also used in a color image forming apparatus.

To use a whole length of the document-contact face 404 in the main scanning direction for color image forming, one LED element can be provided at a position which is next to the LED element 401 located at the end portion of the LED array. In such a case, the light-guiding member 402 can be made longer by corresponding its length to a length of the lighting unit (i.e., LED array), which becomes longer by adding LED elements as above-mentioned.

Example 2

Example 2 has following conditions.

LED:
  Number: 13
  Pitch: 5 mm
  Light-source unit length: Wl=60 mm

Figure 11:
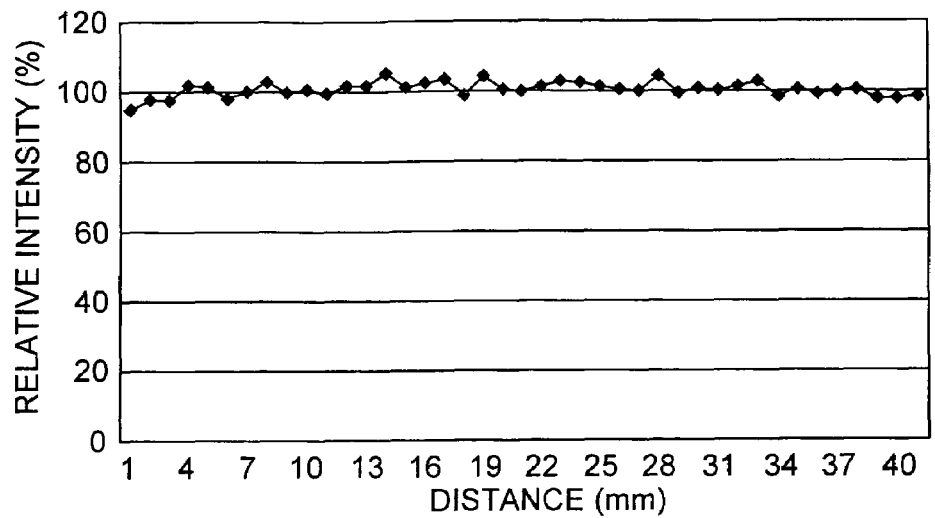
FIG. 11 is a graph for light intensity distribution in a main scanning direction for an Example 2.

Document-Contact Face:
  Length (main scanning direction): Wp=41 mm
  Width (sub-scanning direction): 31 mm Light-Guiding Member:
　　Length (main scanning direction): Wg=80 mm
　　Thickness: 1 mm
　　Width (length in optical axis direction): 8 mm
　　Face 402c and 402d: mirror face (reflection rate 100%)
　　Face 402e and 402f: no reflection (normal transparent face)
　FIG. 11 shows a light intensity distribution in the main scanning direction for Example 2.

In Example 2, one LED is added to the both end portions of the LED array used in Example 1 (i.e., two LEDs are added) and a length of the light-guiding member 402 is set longer than in Example 1.

With such a configuration, the edge portion of the document-contact face 404 having a drop of light intensity as shown in FIG. 10C (i.e., Example 1) comes to a position which is outside of the length "Wp" of the document-contact face 404 of Example 2, and thereby a light intensity distribution having a substantially flat shape (i.e., substantially no light intensity drop) is obtained on the document-contact face 404.

Although a light intensity distribution having a substantially flat shape can be obtained by such a configuration, such a configuration inherently increases a number of LED elements 401 to be used, and leads to a larger apparatus, which is not favorable.

Example 3

Example 3 has following conditions.

LED:
　　Number: 11
　　Pitch: 5 mm
　　Light-source unit length: WI=50 mm

Document-Contact Face:
　　Length (main scanning direction): Wp=41 mm
　　Width (sub-scanning direction): 31 mm Light-Guiding Member:
　　Length (main scanning direction): Wg=65 mm
　　Thickness: 1 mm
　　Width (length in optical axis direction): 8 mm
　　Face 402c and 402d: mirror face (reflection rate 100%)
　　Face 402e and 402f: mirror face (reflection rate 100%)
　FIG. 12 shows a light intensity distribution in the main scanning direction for Example 3.

Different from Example 1, in Example 3 the faces 402e and 402f of the light-guiding member 402 are changed to reflection faces.

Figure 12:
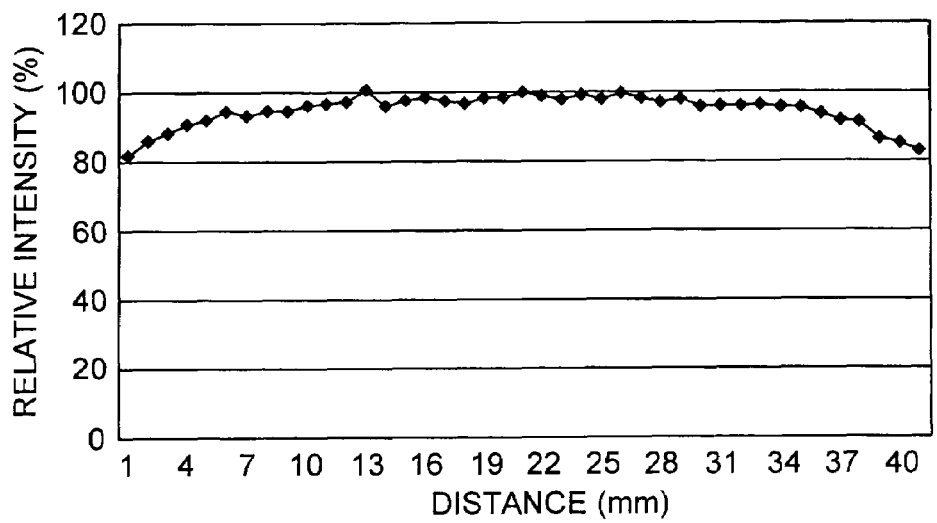
FIG. 12 is a graph for light intensity distribution in a main scanning direction for an Example 3.

However, the light intensity distribution in the main scanning direction shown in FIG. 12 does not show an improvement compared to the light intensity distribution in the main scanning direction shown in FIG. 10C (i.e., Example 1).

This may due to a fact that the length Wg of the light-guiding member 402 is longer than the length WI of the light-source unit (i.e., LED array) by 15 mm.

The light-guiding member 402 and the light-source unit (i.e., LED array) are arranged by matching a center line of the light-guiding member 402 and the light-source unit (i.e., LED array). Therefore, each end portion of the light-guiding member 402 and the light-source unit (i.e., LED array) has a difference in length for 7.5 mm. Because the pitch of adjacent LED elements 401 is set to 5 mm, a difference of 7.5 mm between the end portion of the LED array and each of the faces 402e and 402f of the light-guiding member 402 is three times of 2.5 mm, which is a half pitch of the LED elements (i.e., 5 mm). Accordingly, the faces 402e and 402f (i.e., reflection faces) of the light-guiding member 402 may not be functioning effectively.

Therefore, Example 3 can be used for a monochrome image forming apparatus in a similar manner as in Example 1, but may not be preferably used for a color image forming apparatus.

Example 4

Example 4 has following conditions.

LED:
　　Number: 11
　　Pitch: 5 mm
　　Light-source unit length: WI=50 mm
　　Document-contact face:
　　Length (main scanning direction): Wp=41 mm
　　Width (sub-scanning direction): 31 mm Light-Guiding Member:
　　Length (main scanning direction): Wg=55 mm
　　Thickness: 1 mm
　　Width (length in optical axis direction): 8 mm
　　Face 402c and 402d: mirror face (reflection rate 100%)
　　Face 402e and 402f: mirror face (reflection rate 100%)
　FIG. 13 shows a light intensity distribution in the main scanning direction for Example 4.

In Example 4, the length Wg of the light-guiding member 402 of is shorter than that in Example 3 by 10 mm, and the length Wg of the light-guiding member 402 is longer than the light-source unit length WI by 5 mm.

Therefore, in Example 4, the faces 402e and 402f (i.e., reflection faces) of the light-guiding member 402 are distanced from the LED element 401 at the end portion of the LED array by 2.5 mm, which is equal to one-half of the LED pitch (i.e., 5 mm).

Figure 13:
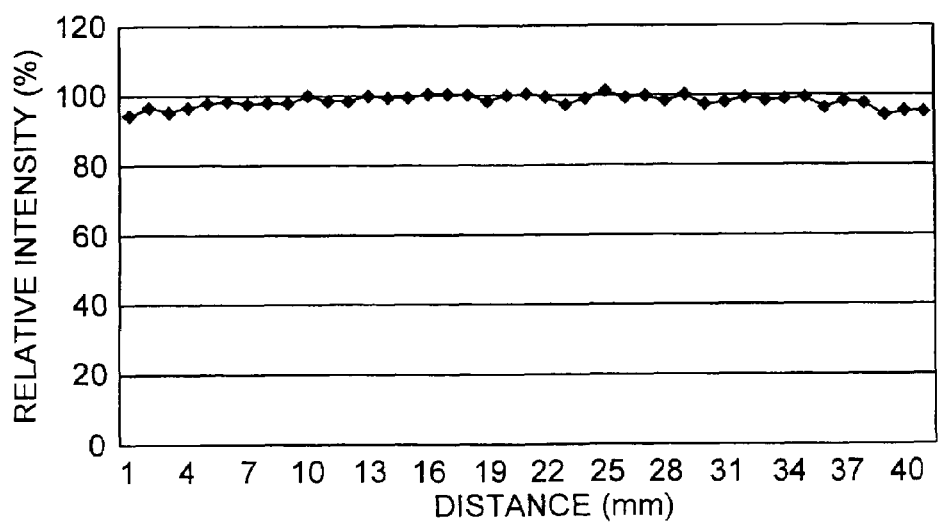
FIG. 13 is a graph for light intensity distribution in a main scanning direction for an Example 4.

Therefore, as shown in FIG. 13, a substantially flat-shaped light intensity distribution in the main scanning direction is obtained. In FIG. 13, an unevenness of the light intensity is about 5%.

Example 5

Example 5 has following conditions.

LED:
　　Number: 23
　　Pitch: 5 mm
　　Light-source unit length: WI=110 mm

Figure 14:
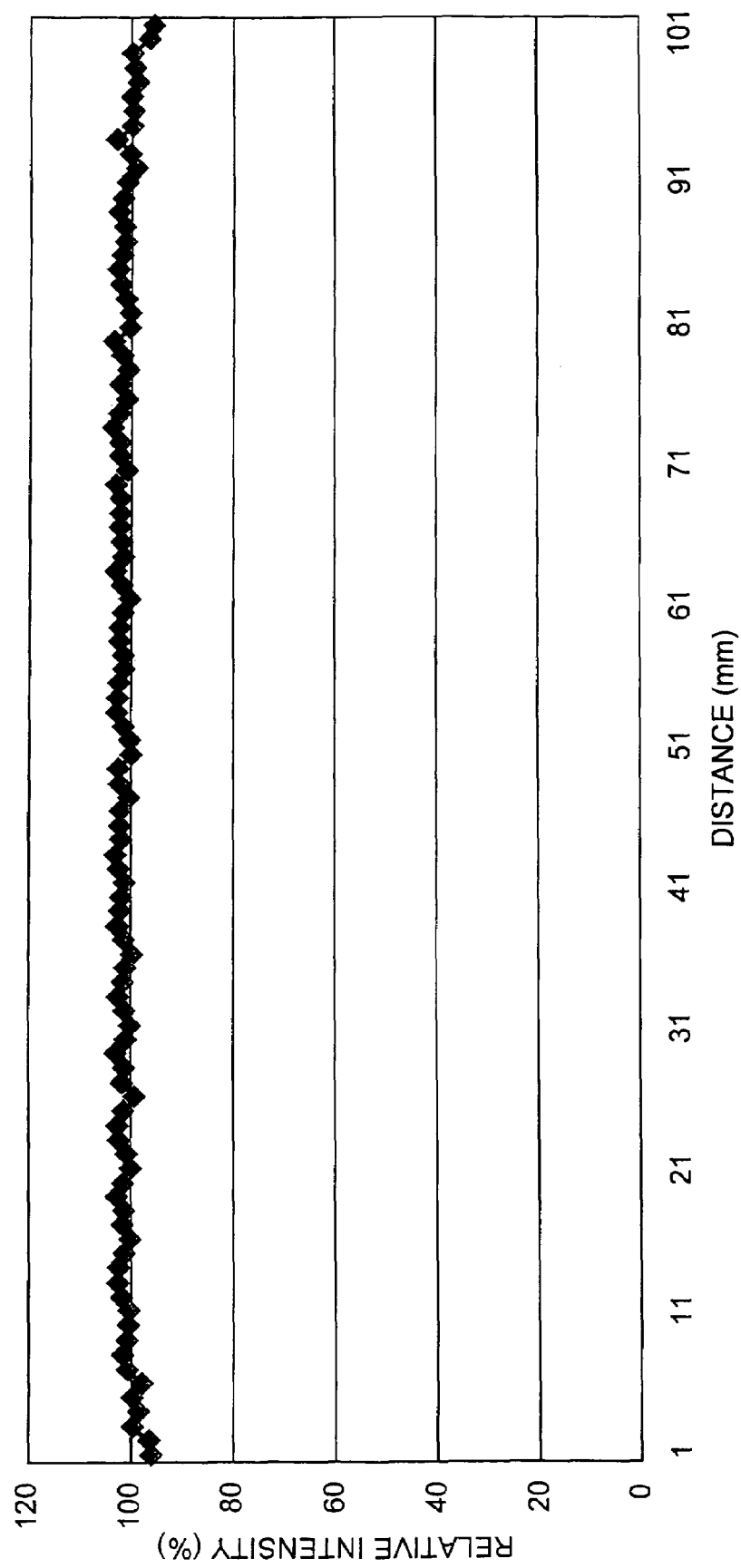
FIG. 14 is a graph for light intensity distribution in a main scanning direction for an Example 5.

Document-Contact Face:
　　Length (main scanning direction): Wp=101 mm
　　Width (sub-scanning direction): 31 mm Light-Guiding Member:
　　Length (main scanning direction): Wg=115 mm
　　Thickness: 1 mm
　　Width (length in optical axis direction): 8 mm
　　Face 402c and 402d: mirror face (reflection rate 100%)
　　Face 402e and 402f: mirror face (reflection rate 100%)
　FIG. 14 shows a light intensity distribution in the main scanning direction for Example 5.

In Example 5, an area of the document-contact face 404 becomes larger than an area of the document-contact face 404 in Example 1. Accordingly, a number of LED elements in the main scanning direction is increased in Example 5.

In Example 5, the faces 402e and 402f (i.e., reflection faces) of the light-guiding member 402 are distanced from the LED element 401 at the end portion of the LED array by 2.5 mm, which is equal to one-half of the LED pitch (i.e., 5 mm).

Example 6

Example 6 has following conditions.

LED:
  Number: 11
  Pitch: 5 mm
  Light-source unit length: WI=50 mm

Document-Contact Face:
  Length (main scanning direction): Wp=41 mm
  Width (sub-scanning direction): 31 mm
  Light-guiding member:
  Length (main scanning direction): Wg=55 mm
  Thickness: 1 mm
  Width (length in optical axis direction): 8 mm
  Face 402c and 402d: no reflection (normal transparent face)
  Face 402e and 402f: no reflection (normal transparent face)

Figure 15A:
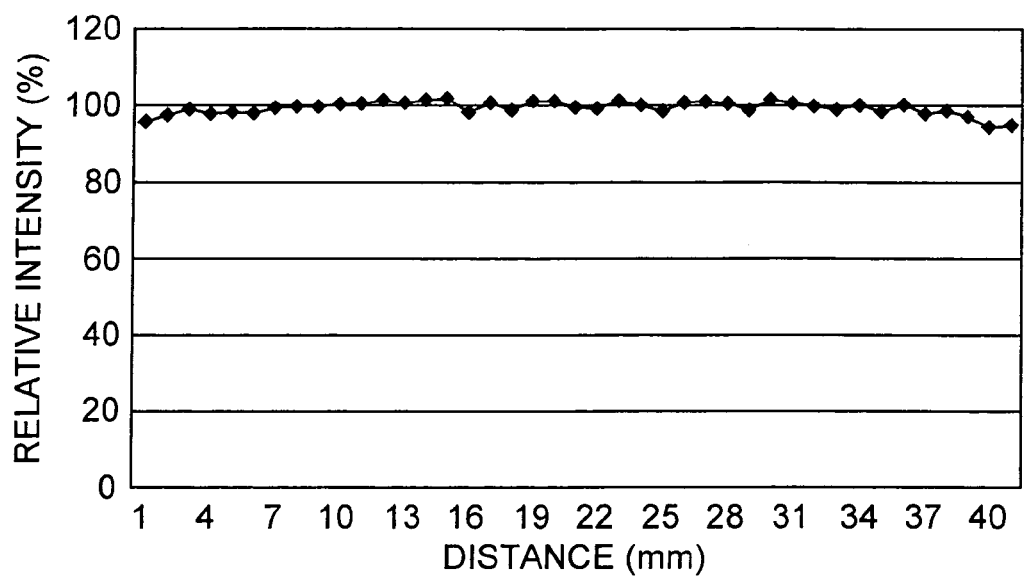
FIG. 15A is a graph for light intensity distribution in a main scanning direction for an Example 6.

FIG. 15A shows a light intensity distribution in the main scanning direction for Example 6. In Example 6, the faces 402e and 402f of the light-guiding member 402 are normal transparent faces instead of reflection faces used in Example 4.

However, the light intensity distribution shown in FIG. 15A has a substantially similar shape as the light intensity distribution in FIG. 13.

Such a result may be explained with an effect of the total reflection of the light beam passing through the light-guiding member 402.

Figure 15B:
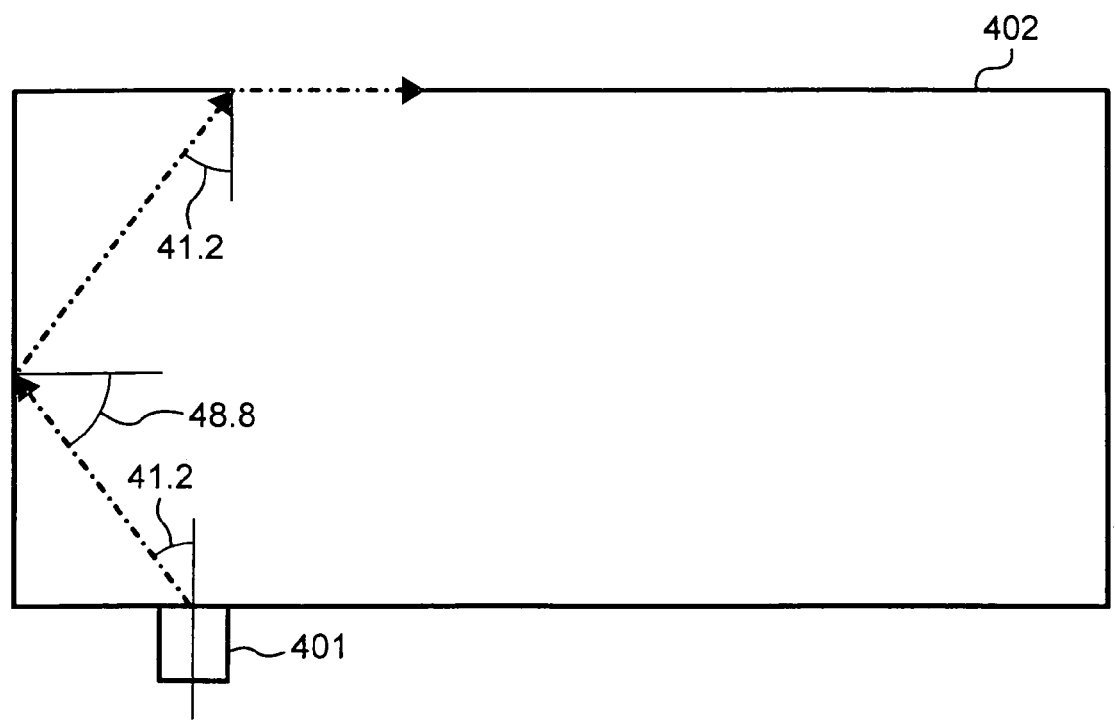
FIG. 15B shows a schematic view explaining a total reflection of a light beam in a light-guiding member.

FIG. 15B shows a schematic view explaining a total reflection of a light beam passing through the light-guiding member 402. In FIG. 15B, a light beam emitted from the LED element enters the face 401a of the light-guiding member 402 having a refractive index of nd=1.517, for example.

According to a calculation of critical angle, the light beam entering the light-guiding member 402 reflects totally at the face 402b with an angle of approximately 41.2° (i.e., critical angle).

Such light beam reaches the face 402e with an angle of 48.8° which is a complementary angle of 41.2° as shown in FIG. 15B. The angle of 48.8° is larger than the critical angle of 41.2°, and thereby the light beam reflects at the face 402e in a total reflection manner.

Other light beams that reach the face 402e have angles larger than the angle of 48.8°, and thereby the other light beams also reflect at the face 402e in total reflection manner. Such total reflection occurs also at the face 402f in a similar manner. Therefore, a drop of light intensity that occurs at the edge portion of the document-contact face 404 in Example 1 may not be caused because the faces 402e and 402f have no mirror faces.

Rather, a drop of light intensity that occurs at the edge portion of the document-contact face 404 in Example 1 may be related to a distance between the face 402e (or 402f) and the LED element 401 at the end portion of the LED array. Specifically, the larger the distance between the face 402e (or 402f) and the LED element 401 at the end portion of the LED array, the more likely a drop of light intensity at the edge portion of the document-contact face 404 may happen.

The above-described calculation is obtained by using glass of "BK7" having a refraction index nd=1.517. Hereinafter, materials for the light-guiding member 402 are changed and explained as below.

When a critical angle is defined as "β" for the light-guiding member 402, a light beam enters the face 402c or 402d with a complementary angle of the critical angle "β."

A calculation is conducted so that the complementary angle also becomes a critical angle. In other words, from a relation of "90°−β=β," β=45° is obtained. Then the refraction index "n" of the light-guiding member 402 (i.e., medium) is calculated as below.

$$n=1/\sin 45°=1/(1/(\sqrt{2}))=(\sqrt{2})\approx 1.414$$

A medium having a refraction index which is close to the above-calculated refraction index "1.414" or smaller than the refraction index "1.414" includes transparent resinous materials.

Each medium has its refraction index according to a wavelength of a light beam. For example, the refraction index is generally defined as "nd" which is a refraction index for d-line. The d-line includes a wavelength of 587.56 nm.

In the above Examples of the present invention, if a part of a wavelength included in the white light does not reflect in a total reflection manner, the document-contact face 404 unfavorably receives a colored-light.

Therefore, the above-mentioned refraction index "n" is preferably set to a value corresponding to a longer wavelength side (e.g., 700 nm) of the visible light, wherein the refraction index for the longer wavelength side (e.g., 700 nm) of the visible light takes a smallest value for the visible light.

If the light-guiding member 402 employs a medium having a refraction index larger than 1.414 at the longer wavelength side, the faces 402c, 402d, 402e, and 402f do not require mirror function thereon, and thereby a transparent member can be used as the light-guiding member 402.

Figure 16:
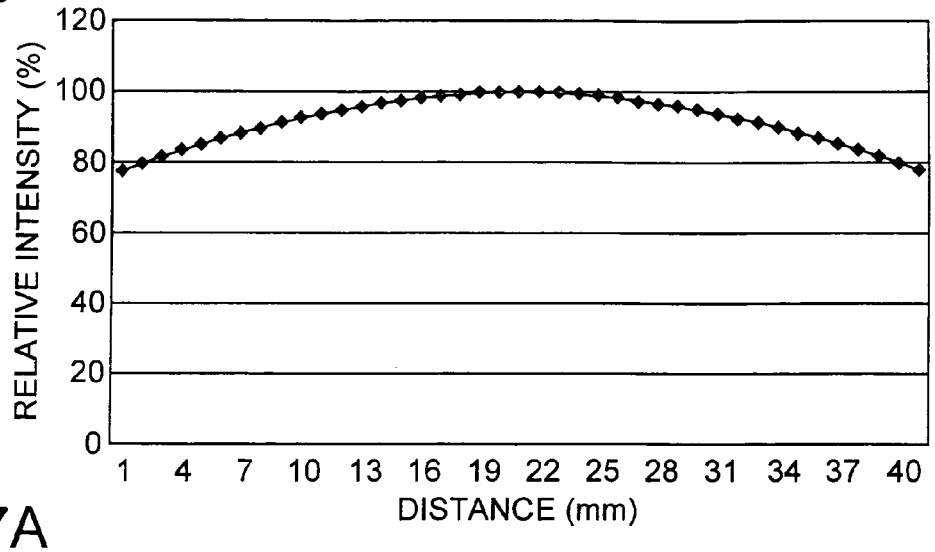
FIG. 16 is graph for light intensity distribution on a line sensor in a main scanning direction for Example 4 having an effect of fourth-power-of-cosine law.

FIG. 16 shows a light intensity distribution in the main scanning direction having an effect of fourth-power-of-cosine law. FIG. 16 shows a light intensity distribution on the line sensor 406 in the main scanning direction using the focus lens 405 for focusing images from the document-contact face 404 in Example 4, wherein the focus lens 405 has a half angle of 20°.

Even if the document-contact face 404 has a substantially flat-shaped light intensity distribution as shown in FIG. 13, the light intensity drops at the edge portion of the line sensor 406 by approximately 22% as shown in FIG. 16.

Example 7

Example 7 has following conditions, wherein the conditions are similar as those in Example 4 except an output power of LED element 401.

LED:
  Number: 11
  Pitch: 5 mm
  Output power of LED: See Table 1

TABLE 1

| | | | | | n | | | | | |
|---|---|---|---|---|---|---|---|---|---|---|
| | 5 | 4 | 3 | 2 | 1 | 0 | 1 | 2 | 3 | 4 | 5 |
| I(watt) | 1.6 | 1.45 | 1.3 | 1.2 | 1.1 | 1.0 | 1.1 | 1.2 | 1.3 | 1.45 | 1.6 |

Figure 17A:
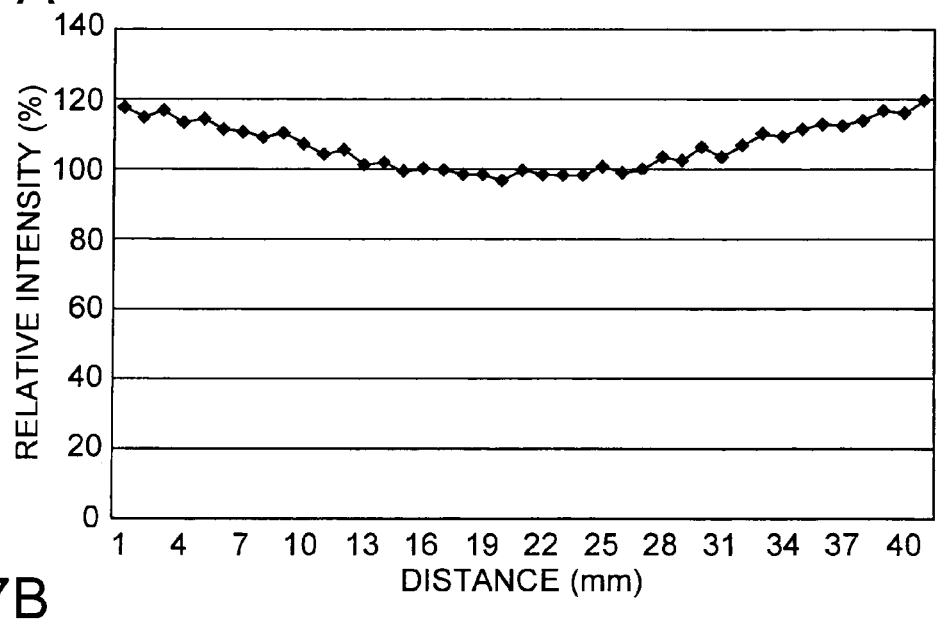
FIG. 17A is a graph for light intensity distribution on a document surface in a main scanning direction for an Example 7.
Figure 17B:
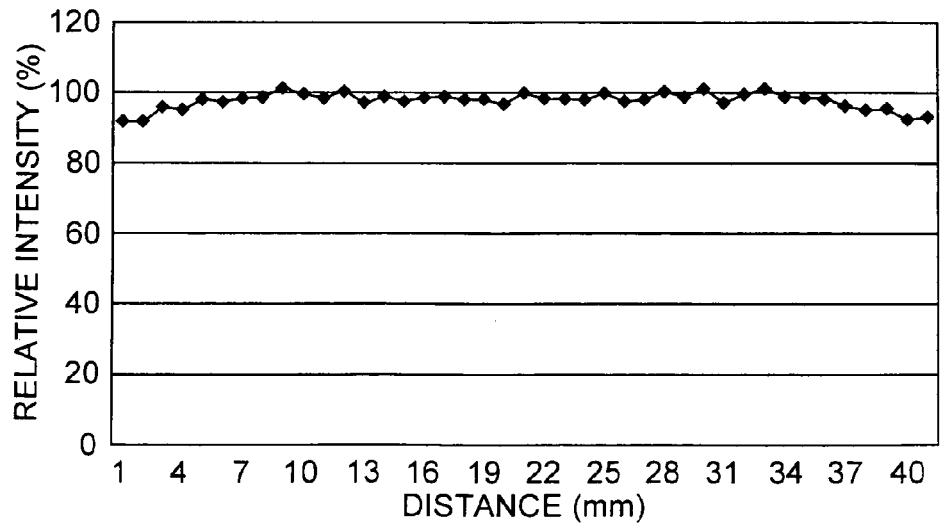
FIG. 17B is a graph for light intensity distribution on a line sensor in a main scanning direction for Example 7.

FIGS. 17A and 17B show light intensity distribution in the main scanning direction for Example 7. FIG. 17A show a light intensity distribution on the document-contact face, and FIG. 17B shows a light intensity distribution on the line sensor (i.e., photoelectric converter).

In Example 7, $n$max=5, and $I(n$max$)=1.6 \times I(0) < 4 \times I(0)$

In Example 7, the output power of LED element 401 is gradually increased from the center portion to the end portion of the LED array to reduce an effect of fourth-power-of-cosine law to the light intensity at the edge portion of the line sensor (i.e., photoelectric converter).

As shown in FIG. 17A, the light intensity at the edge portion of the document-contact face 404 is larger than the light intensity at the center portion of the document-contact face 404 by approximately 20%. As shown in FIG. 17B, the light intensity distribution on the line sensor 406 in Example 7 is improved with respect to the light intensity distribution on the line sensor 406 shown in FIG. 16.

Although the light intensity distribution on the line sensor 406 in Example 7 shows some drop of light intensity at the edge portion of the line sensor (i.e., photoelectric converter) (i.e., approximately 7%), such light intensity drop does not cause a drawback for color image forming.

Figure 18:
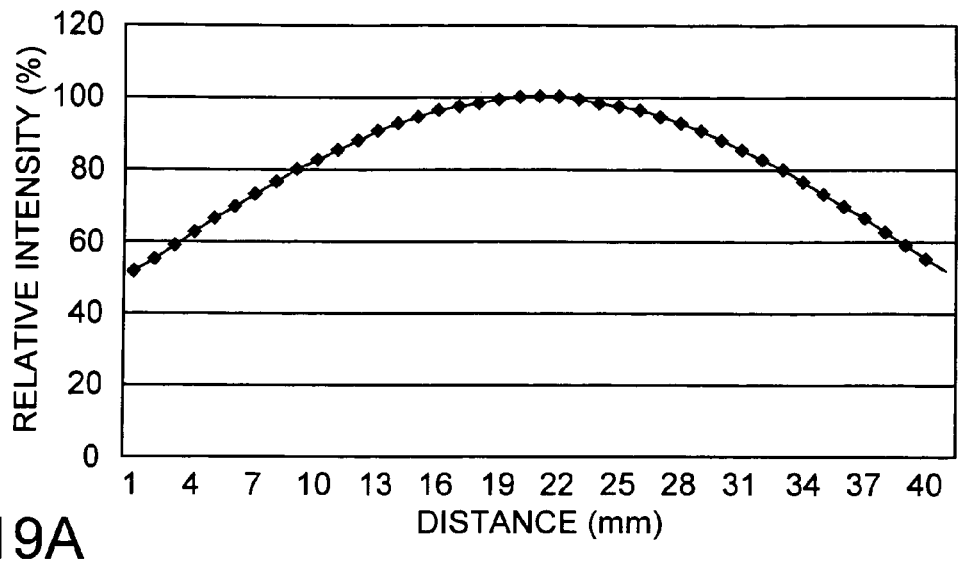
FIG. 18 is graph for light intensity distribution on a line sensor in a main scanning direction for Example 4 when a half angle of a focus lens is 32°.

FIG. 18 shows a light intensity distribution on the line sensor (i.e., photoelectric converter) in the main scanning direction when the focus lens 405 has a half angle of 32°. FIG. 18 shows a light intensity distribution on the line sensor (i.e., photoelectric converter) when focusing an image on the line sensor 406 by the focus lens 405 in a similar manner in Example 4.

However, the focus lens 405 has a half angle of 32°, which is larger than 20°.

In this case, a light intensity at the edge portion of the line sensor (i.e., photoelectric converter) drops by more than 48% compared to a light intensity at the center portion of the line sensor (i.e., photoelectric converter).

When such focus lens 405 is used, an output power of an LED element 401 at the end portion of the LED array needs to be further increased to obtain a flat-shaped light intensity distribution on the line sensor (i.e., photoelectric converter).

Example 8

Example 8 has following conditions.

LED:
  Number: 11
  Pitch: 5 mm
  Output power of LED: See Table 2

TABLE 2

| | | | | | n | | | | | |
|---|---|---|---|---|---|---|---|---|---|---|
| 5 | 4 | 3 | 2 | 1 | 0 | 1 | 2 | 3 | 4 | 5 |
| I(watt) 3.8 | 2.0 | 1.6 | 1.4 | 1.2 | 1.0 | 1.2 | 1.4 | 1.6 | 2.0 | 3.8 |

Figure 19A:
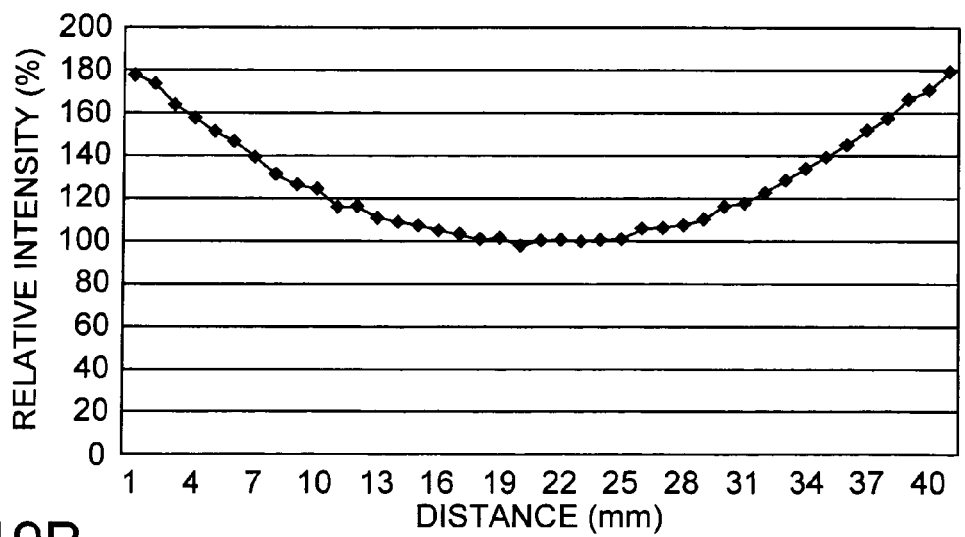
FIG. 19A is a graph for light intensity distribution on a document surface in a main scanning direction for an Example 8.
Figure 19B:
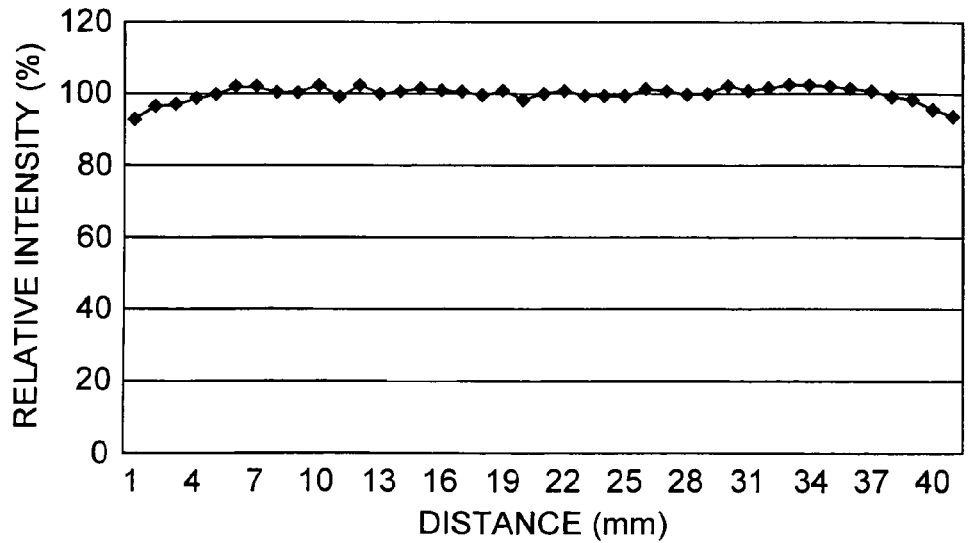
FIG. 19B is a graph for light intensity distribution on a line sensor in a main scanning direction for Example 8.

FIGS. 19A and 19B show light intensity distribution in the main scanning direction for Example 8. FIG. 19A shows a light intensity distribution on the document-contact face in the main scanning direction, and FIG. 19B shows a light intensity distribution on the line sensor (i.e., photoelectric converter) in the main scanning direction. In Example 8, $n$max=5, and $I(n$max$)=3.8 \times I(0) < 4 \times I(0)$.

In Example 8, the focus lens 405 has a half angle of 32°, and thereby a drop of light intensity at the edge portion of the line sensor (i.e., photoelectric converter) caused by a fourth-power-of-cosine law becomes significant. Therefore, an output power of LED at the end portion of the LED array is set to a larger value.

As shown in FIG. 19A, a light intensity at the edge portion on the document-contact face 404 is set to be larger than at the center portion on the document-contact face 404 by approximately 80%. As a result, as shown in FIG. 19B, a drop of the light intensity at the edge portion of the line sensor (i.e., photoelectric converter) is maintained within approximately 7% compared to the light intensity at the center portion of the line sensor (i.e., photoelectric converter).

Furthermore, it is assumed that it is not practicable to increase the half angle more than 32°.

Accordingly, an output power of LED element 401 at the end portion of the LED array can be sufficiently set within a limit calculated from the above-mentioned formula even if setting error is taken into account.

Example 9

Example 9 has following conditions, wherein the conditions are similar as those in Example 4 except LED pitch.

LED:
  Number: 11
  Pitch: see Table 3

TABLE 3

| | Pitch No. | | | | |
|---|---|---|---|---|---|
| | PI(0) | PI(1) | PI(2) | PI(3) | PI(4) |
| LED No. | 0-1 | 1-2 | 2-3 | 3-4 | 4-5 |
| Pitch (mm) | 6.0 | 5.8 | 5.6 | 5.2 | 2.4 |

Figure 20A:
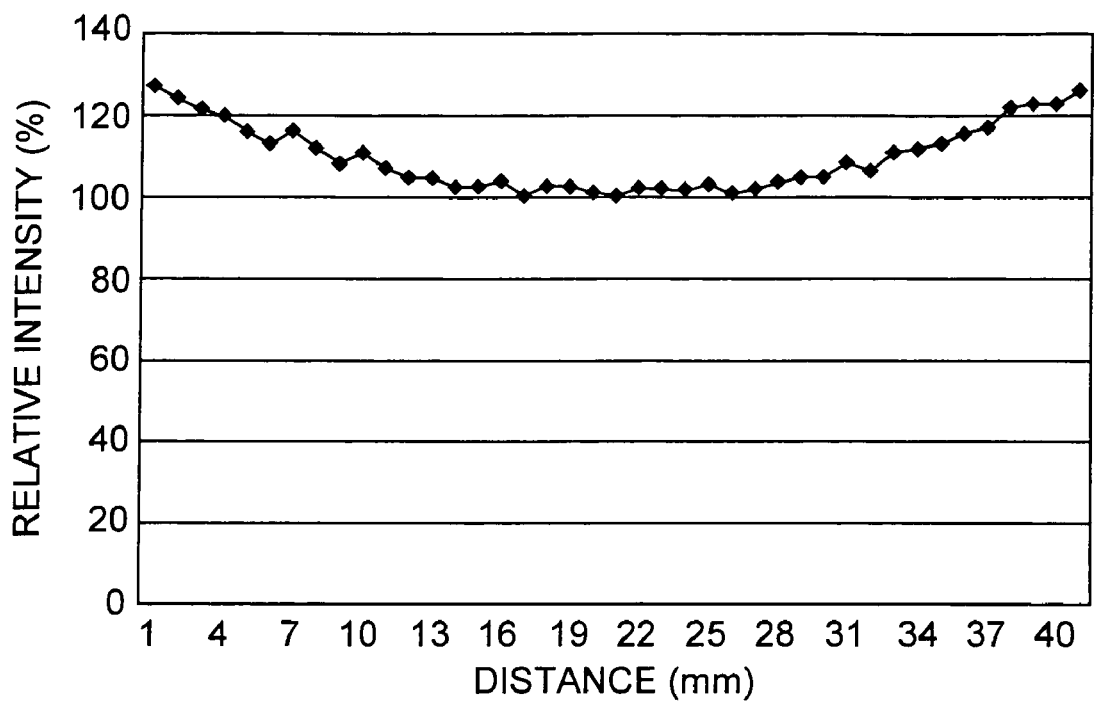
FIG. 20A is a graph for light intensity distribution on a document surface in a main scanning direction for an Example 9.
Figure 20B:
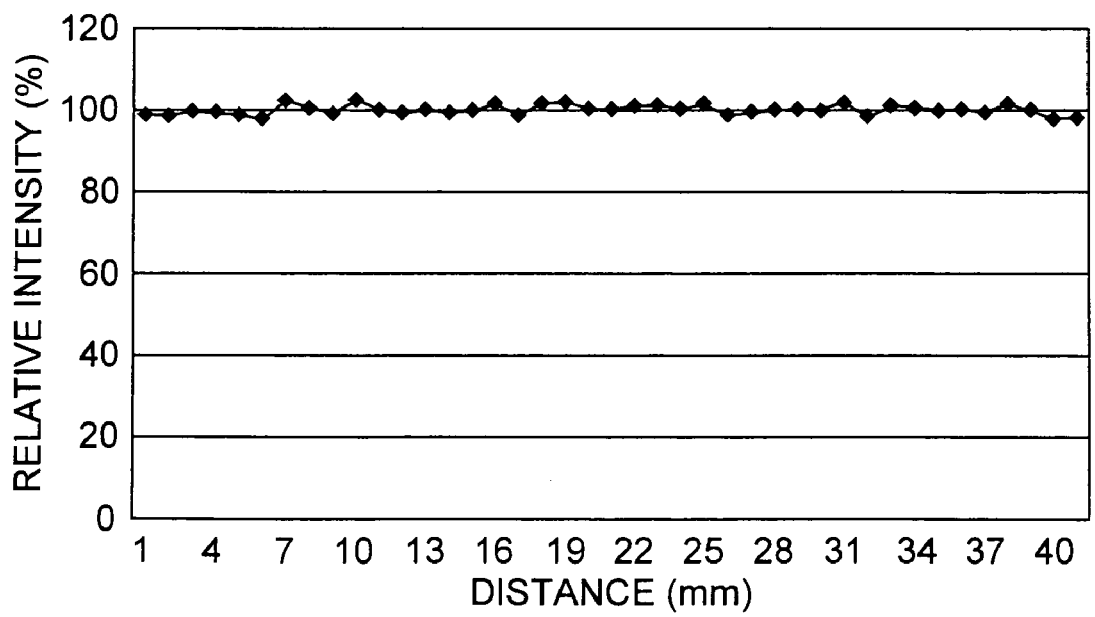
FIG. 20B is a graph for light intensity distribution on a line sensor in a main scanning direction for Example 9.

FIGS. 20A and 20B show light intensity distribution in the main scanning direction for Example 9. FIG. 20A shows a light intensity distribution on the document-contact face in the main scanning direction, and FIG. 20B shows a light intensity distribution on the line sensor (i.e., photoelectric converter) in the main scanning direction.

In Example 9, a pitch of adjacent LED elements is set to be smaller in the direction from the center portion to the end portion of the LED array. With such a configuration, the light intensity at the end portion of the LED array can be increased and thereby a drop of light intensity shown in FIG. 16 can be suppressed.

Table 3 shows the pitch data for the one side from the center portion of the LED array because the other side from the center portion takes the same data. In Table 3, the following relationships are established when n is one or greater (i.e., $n \leq 1$).

$PI(n) < PI(n-1)$, and $PI(4) = 0.4 \times PI(0)$

As shown in FIG. 20A, in Example 9, the light intensity at the edge portion of the document-contact face 404 is larger than the light intensity at the center portion of the document-contact face 404 by approximately 25%. Accordingly, as shown in FIG. 20B, in Example 9, the light intensity distribution on the line sensor 406 becomes substantially flat.

In Example 9, the focus lens 405 having a half angle of 20° is used.

If the focus lens 405 having a half angle of 32° is used, an LED pitch at the end portion of the LED array needs to be set more smaller. In such a case, although not shown, an LED pitch "PI(n)" at the end portion of the LED array becomes smaller with respect to the pitch "PI(0)" of the center portion of the LED array, which is expressed as below.

$$PI(4)=0.2 \times PI(0)$$

In Example 9, it is assumed that adjacent LED elements 401 have a different pitch defined as "PI(n)<PI(n−1)."

However, if the length of the LED array in the main scanning direction becomes longer, a group of plurality of neighboring pitches of LED elements 401 can be set to a same value, and thereby pitches in the main scanning direction can be step-wisely decreased group-by-group.

Therefore, the above-mentioned formula can be expressed as below.

$$PI(n) \leq PI(n-1)$$

Although not shown in drawings, an Example which combines the above-mentioned Example 7 and Example 9 can be designed. In other words, such an Example (not shown) includes a configuration having a LED array, in which LED elements 401 are packed condensely at the end portion of the LED array and the light intensity of the LED elements 401 is increased at the end portion of the LED array. Such an Example can also have a similar effect as in Examples 7, 8, and 9.

Hereinafter, a light source, which can be used for the above-mentioned Examples, is explained.

In the above-mentioned Examples, an LED (light emitting diode) element is preferably used as the light source. More specifically, a white LED is preferably used to scan a variety of documents.

The white LED includes a plurality of types. One type of the white LED element is a one-chip type using a phosphor, and another type is a multiple-chip type having two chips and not using a phosphor.

As for the one-chip type, a chip (i.e., emitter) is sealed in a transparent sealing material containing YAG phosphor (yttrium-aluminum-garnet phosphor). The chip includes InGaN (indium-gallium-nitride) and emits a blue light. When the chip emits the blue light, the YAG phosphor is excited and emits a yellow light. Because the blue and yellow are complementary light colors, the one-chip white LED element can emit a white light.

On one hand, as for the multiple-chip type having two chips, the two chips emit different colors and a white light is emitted by mixing the different colors. Specifically, a plurality of chips are arranged on a same plane, and when different colors emitted from the plurality of chips and mixed, the multiple-chip type having two chips can emit a white light. For example, when two chips are used, the two chips include a chip emitting a blue light and a chip emitting a yellow light. Furthermore, when three chips are used, the three chips include a chip emitting a red light, a chip emitting a blue light and a chip emitting a green light, for example.

In general, when a plurality of color lights emitted from chips, the plurality of color lights are mixed as white light, and the LED element can emit a white light.

In some cases, the plurality of color lights are not mixed completely in the LED element. However, in such cases, a substantially white light can be emitted from the light-guiding member because the lights emitted from the LED element reflect for a plurality of times in the light-guiding member.

The above-described document lighting unit can be used in an image scanning unit and such image scanning unit can be incorporated in an image forming apparatus.

Hereinafter, a light intensity distribution in the sub-scanning direction will be described in detail. Drawings used in the above-description for explaining the light intensity in the main scanning direction are also applied to for explaining the light intensity in the sub-scanning direction as below.

FIGS. 6A and 6B show schematic views of a lighting configuration viewed from a main scanning direction and a sub-scanning direction, respectively. As shown in FIGS. 6A and 6B, the lighting configuration includes the LED element 401, the light-guiding member 402, the contact glass 403, and the document-contact face 404.

In FIG. 6A, a dotted curve line represents a light intensity distribution of each LED elements in the main scanning direction, and a solid curve line represents a light intensity distribution which synthesizes the light intensity distribution of each LED elements in the main scanning direction. In FIG. 6B, a solid curve line represents a light intensity distribution of an LED element in the sub-scanning direction.

Figure 2A:
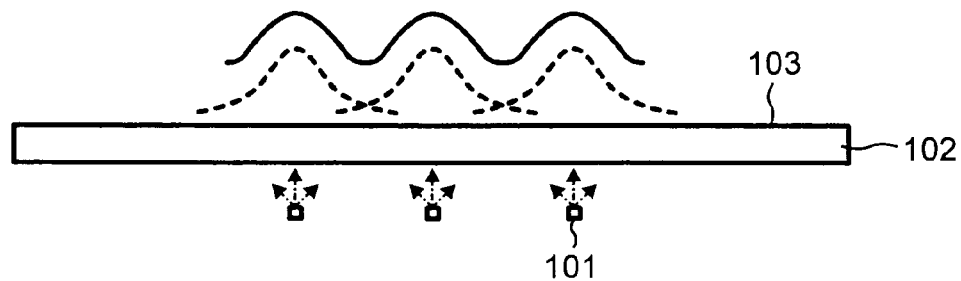
FIGS. 2A and 2B are schematic views for a background direct LED illumination method.
Figure 2B:
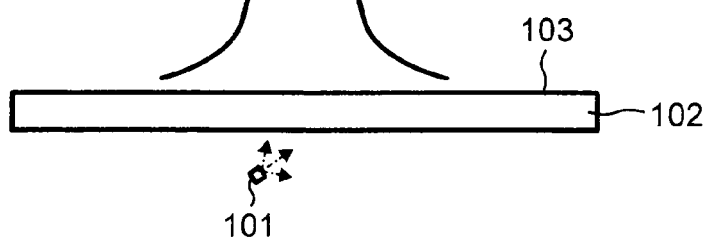
Figure 3A:
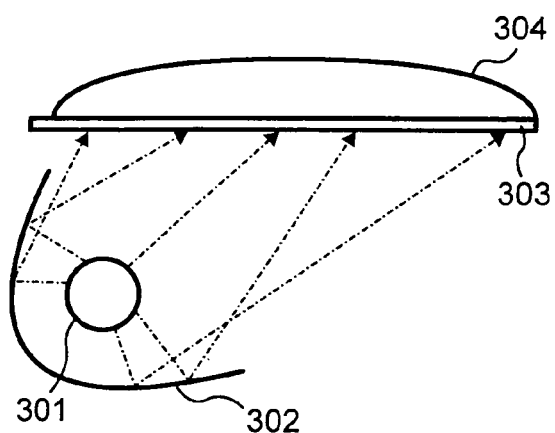
FIGS. 3A and 3B are schematic views for a background illumination using a bar-shaped light source.
Figure 3B:
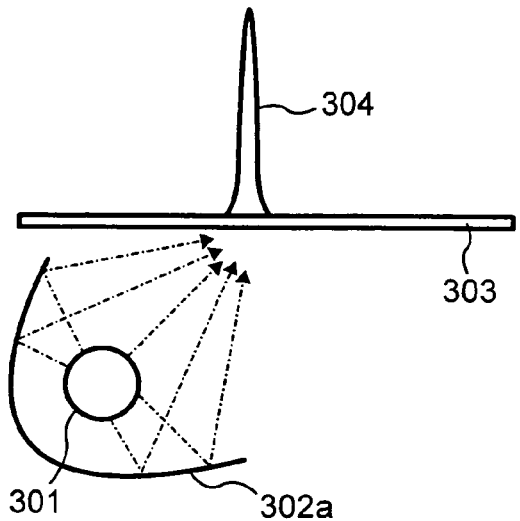
Figure 4:
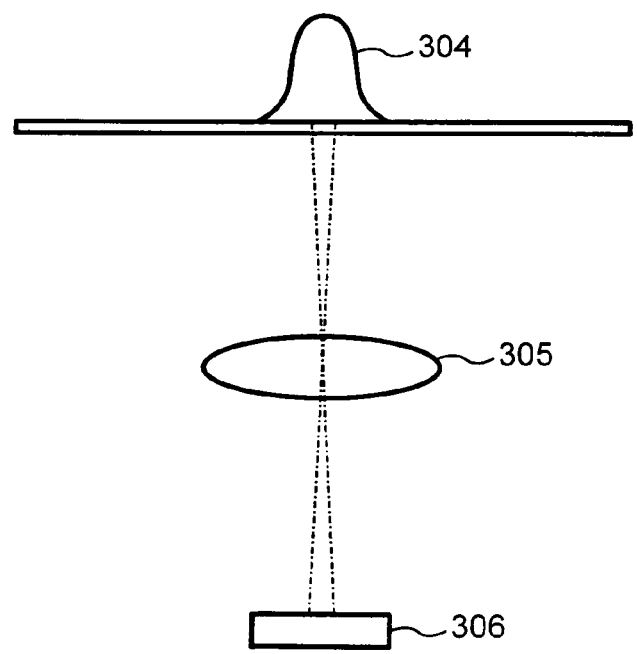
FIG. 4 is a schematic configuration for a light-receiving element and a focus lens in an image forming apparatus.
Figure 5A:
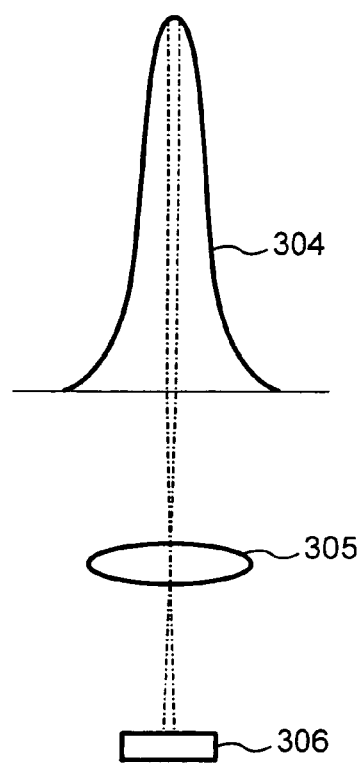
FIGS. 5A, 5B, 5C, and 5D explain schematic relationships between light intensity distribution curves and scanning area.
Figure 5B:
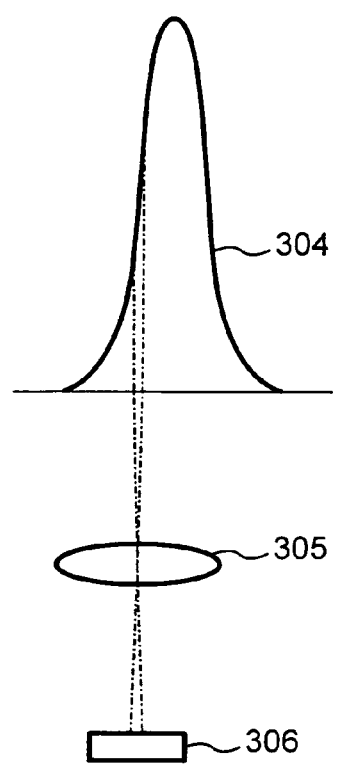
Figure 5C:
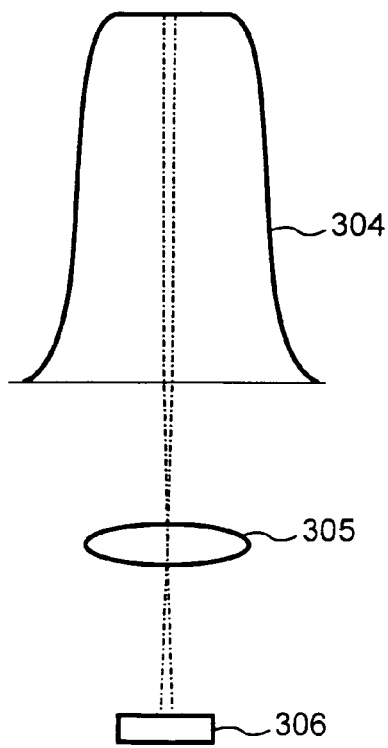
Figure 5D:
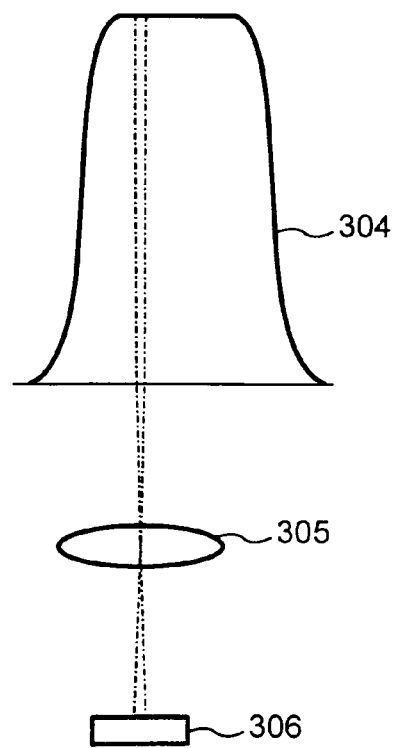

As previously shown in FIG. 2A, in a background art, the LED elements 101 are provided to a position which is relatively closer to the contact glass 102, and thereby when light intensity is increased, an unevenness of the light intensity occurs significantly in the main scanning direction. However, if the LED elements 101 are distanced from the contact glass 102, the light intensity drops significantly, and the light intensity drops to a level which is not favorable for a practical use.

In view of such drawbacks in a background art, the configuration shown in FIGS. 6A and 6B is employed.

In FIG. 6A, each of the LED elements 401 is distanced from the contact glass 403 by providing the light-guiding member 402 between the LED elements 401 and the contact glass 403. Therefore, light beams emitted from the LED elements 401 diffuse and synthesize with each other before outgoing from the contact glass 403, and thereby such light beams have a light intensity distribution which has a substantial evenness of light intensity in the main scanning direction.

As for the sub-scanning direction, light beams reflect a plurality of times in the light-guiding member 402, and go out from the light-guiding member 402 at a position which is close to the contact glass 403. Therefore, a diffusion of light beams in the sub-scanning direction can be reduced, and thereby a drop of light intensity in the sub-scanning direction can be reduced.

To achieve the above-mentioned effect, design considerations are required for an arrangement and light distribution of the LED elements 401 provided in the light-source unit (i.e., LED array), for example.

For example, light intensity unevenness may occur even if a light-guiding member 402 is provided between the LED array and the document-contact face 403 under the following conditions. Such conditions may be a sharp light intensity distribution of each LED element 401, a longer pitch of adjacent LED elements 401, and a smaller width of the light-guiding member 402.

The light intensity unevenness may be eliminated to a level of substantially "zero" if there is no limit is imposed on the manufacturing cost, which is not practical.

The following Example embodiments of the present invention provide conditions that can maintain the light intensity unevenness within a range of 12%, which is a permissible for color image processing.

As shown in FIG. 6B, light emitted from the light-guiding member 402 enters the contact glass 403 with an angle θ, wherein the angle θ is defined by a primary light beam of the LED 401 which passes through the center of the light-guiding member 402 and a normal line drawn from the contact glass 403. In general, the greater the angle θ is, the smaller the light intensity at the contact glass 403 is. An ideal light source emits light beams with a Lambert distribution that can be expressed with the cosine of the angle θ.

Some marketed LED elements have a light intensity distribution that can be approximated by $\cos^{1.5}\theta$, or by $\cos^2\theta$.

In the light-source unit 401, the plurality of LED elements 401 are arranged in an array while aligning light beam emitting direction of the plurality of LED elements 401 in one direction.

Hereinafter, two LED elements 401 which are adjacent to each other are used for explaining light intensity on the document-contact face 404. As for the explanation, two LED elements 401 are used and referred as $1^{st}$ LED and $2^{nd}$ LED to simplify the explanation.

The $1^{st}$ LED and $2^{nd}$ LED emit a first primary light beam having a first light intensity and second primary light beam having a second light intensity. The first and second primary lights passes through the light-guiding member 402 straightly and reaches a first and second points on the document contact face 404, respectively.

Accordingly, a third point which is at the center between the first and second points is assumed, and the third point has a third light intensity which is defined mostly by the first light intensity and second light intensity.

In one case, the light intensity at the first or second point becomes larger than the third light intensity. In another case, the light intensity at the first or second point becomes smaller than the third light intensity.

As above-mentioned, at the third point, the third light intensity is defined mostly by the first light intensity and second light intensity because the $1^{st}$ and $2^{nd}$ LEDs exist most closely to the third point compared to other LEDs 401 in the light-source unit.

If a light intensity difference between the third point and the first or second point can be maintained within 12%, such an illumination configuration can be used for color image processing.

The light intensity at the first, second, and third points can be adjusted by changing a distance-ratio which is defined by dividing a pitch of the $1^{st}$ and $2^{nd}$ LEDs with a distance between the $1^{st}$ and $2^{nd}$ LED to the document-contact face 404. If such a distance-ratio becomes sufficiently larger, the light intensity at the first or second points is mainly defined by the first and second light intensity of the $1^{st}$ and $2^{nd}$ LEDs. In this case, the third light intensity at the third point is defined mainly by the light beams coming from the $1^{st}$ and $2^{nd}$ LEDs.

However, the light beam coming from the $1^{st}$ or $2^{nd}$ LED to the third point has a light intensity which is significantly smaller than the light intensity at the first or second points. Thereby a synthesized third light intensity at the third point becomes smaller than the light intensity at the first or second points.

If the above-mentioned distance-ratio takes a sufficiently smaller value, the third light intensity at the third point may become larger than the light intensity at the first or second points. In other words, the smaller the distance-ratio, the larger the third light intensity at the third point.

In one case, the first or second light intensity at the first or second points takes a light intensity of "Emax", and the third light intensity at the third point takes a light intensity of "Emin," in which "Emax" is larger than "Emin."

In another case, the first or second light intensity at the first or second points takes a light intensity of "Emin," and the third light intensity at the third point takes a light intensity of "Emax," in which "Emin" is smaller than "Emax."

In both cases, a pitch of the $1^{st}$ and $2^{nd}$ LEDs, and a distance from the $1^{st}$ and $2^{nd}$ LEDs to the document-contact face 404 are determined to satisfy a following relationship.

(Emax−Emin)/Emax<0.12

As shown in FIG. 6B, the light-guiding member 402 has an angle θ with respect to the document-contact face 404 in example embodiments of the present invention. In such a configuration, a light beam in the sub-scanning direction diffuses from the face 402b of the light-guiding member 402, which is different from a background configuration which does not have a light-guiding member 402, and thereby the light intensity drop in the sub-scanning direction can be reduced.

Hereinafter, further Examples according to the present invention are explained. The following Examples are conducted based on simulation models by changing parameters.

Example 10

Example 10 has following conditions.

LED Array:
    LED Number: 7
    Arrangement: one line in main scanning direction
    Pitch: 8 mm
    Light distribution: Lambert distribution
    Output power: 10 mW/per one LED
    Light-emitting face: 0.5×0.5 mm (having uniform light intensity distribution)

Light-Guiding Member:
    Length×width×thickness: 60×8×1 mm
    Refraction index: nd=1.517
    Face 402e and 402f: reflection coating (reflection rate 100%)

Components Arrangement:
    Distance from "LED emitting face" to "light-guiding member": close contact
    Distance from "light-guiding member" to "document-contact face": 6 mm
    Angle defined by light-emitting direction and normal line from "document-contact face": 30°

Contact Glass:
    Thickness: 3.2 mm
    Refraction index: nd=1.517

Document-Contact Face:
    Document face is distanced from upper surface of contact glass by 0.01 mm
    Size: 41 mm (main scanning direction)×31 mm (sub-scanning direction)

Figure 21A:
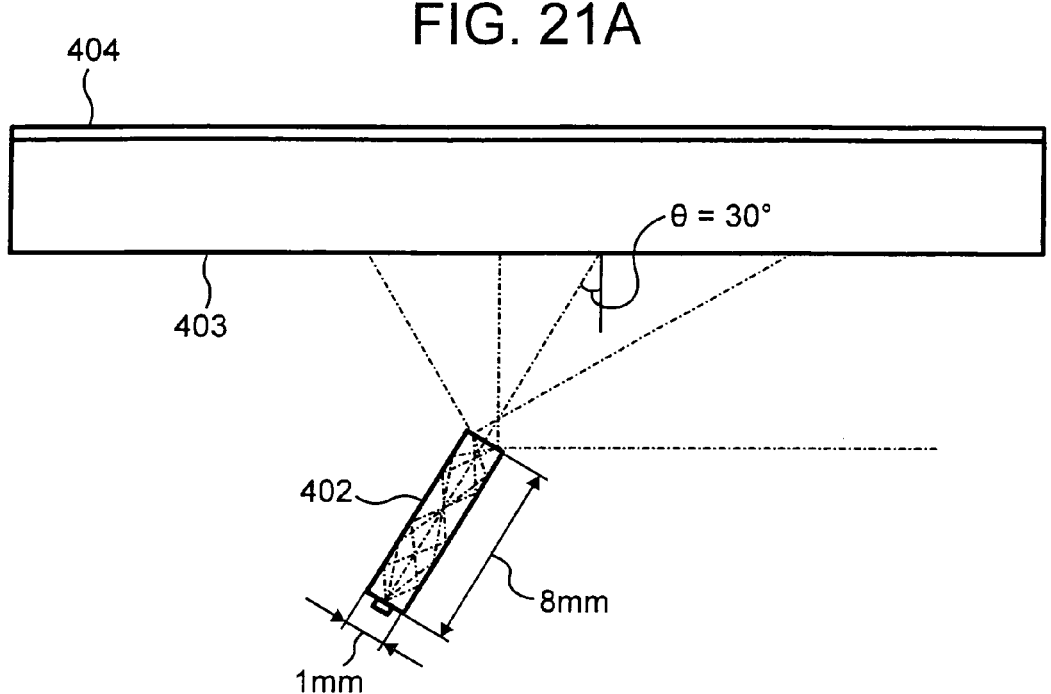
FIG. 21A is a schematic configuration for illumination according to an Example 10.
Figure 21B:
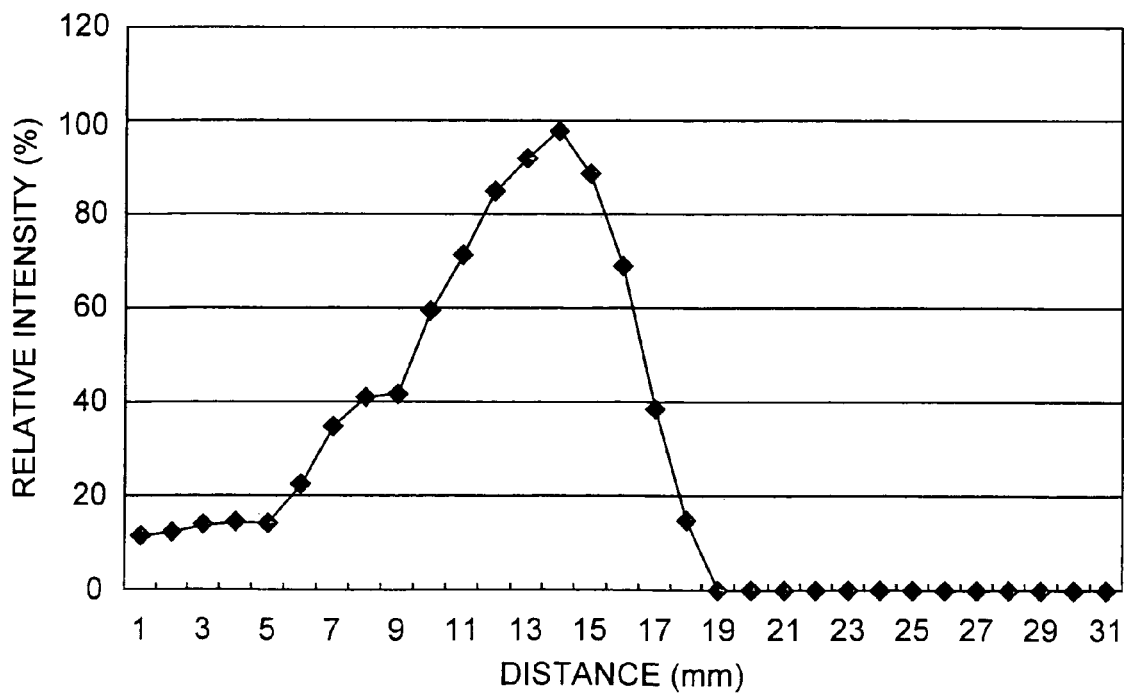
FIG. 21B is a graph for light intensity distribution on a document surface in a sub-scanning direction for Example 10.
Figure 21C:
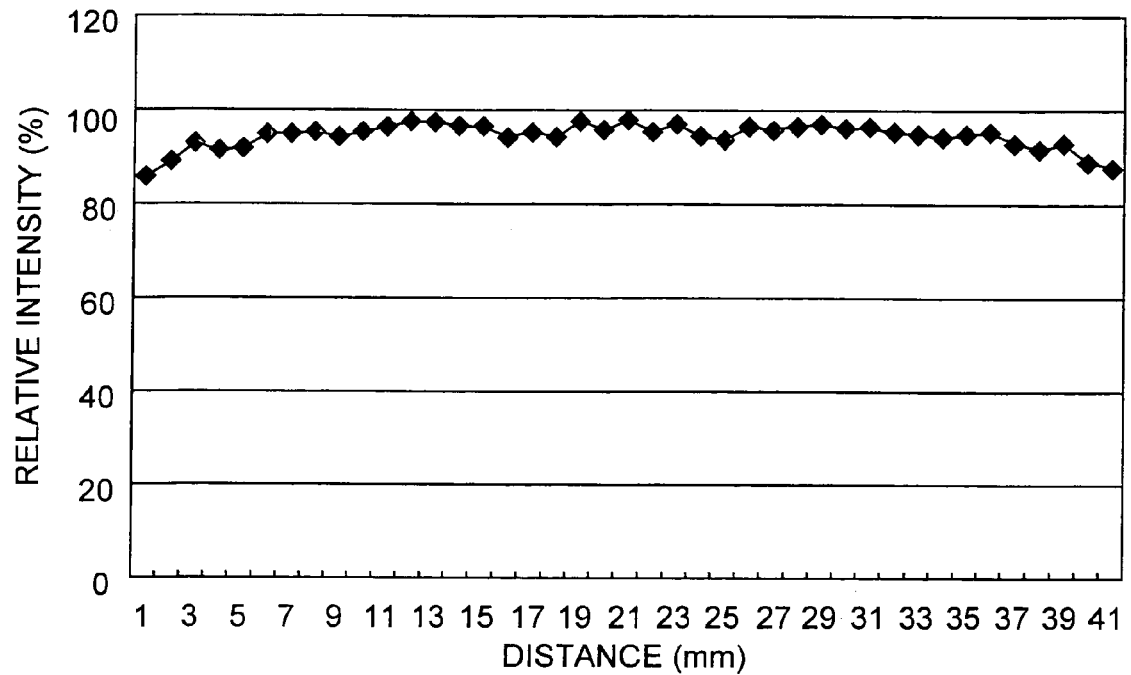
FIG. 21C is a graph for light intensity distribution on a document surface in a main scanning direction for Example 10.

FIG. 21A shows a schematic configuration of illumination for Example 10. FIGS. 21B and 21C show a light intensity distribution for the configuration of Example 10, wherein a horizontal axis represents a positions in the contact glass 403 (unit: mm), and a vertical axis represents a light intensity, and such representation is applied in a similar manner to other drawings showing light intensity distribution to be described later. FIG. 21B shows a light intensity distribution in the sub-scanning direction, and FIG. 21C shows a light intensity distribution in the main scanning direction.

As for the calculation of the light intensity distribution, the following settings are assumed: the number of light beams emitted from the light-source unit is one million; an area of 41 mm×31 mm is divided in each mesh having an area of 1×1 mm; and a number of light beams entered in each mesh is defined as the light intensity for the mesh.

The light intensity distribution in the sub-scanning direction is measured along a center line of the document-contact face 404 in the sub-scanning direction, and a position where the light intensity in the sub-scanning direction becomes a maximum value is determined.

A main scanning direction, which includes such position having the maximum value in the sub-scanning direction, is used for measuring the light intensity distribution in the main scanning direction.

Light intensity distributions in the main scanning direction and the sub-scanning direction for Examples to be described later are measured in a similar manner.

As shown in FIG. 21C, an unevenness of the light intensity in the main scanning direction is not significant.

Figure 21D:
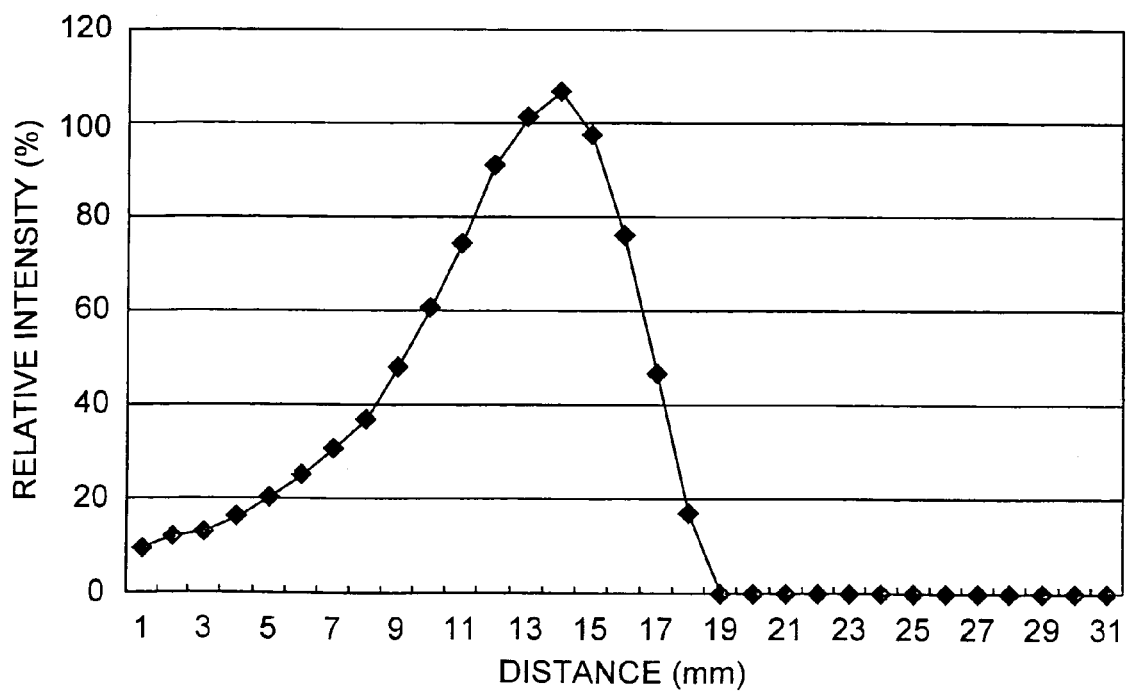
FIG. 21D is a graph for light intensity distribution on a document surface in a sub-scanning direction for a Comparison Example 10.
Figure 21E:
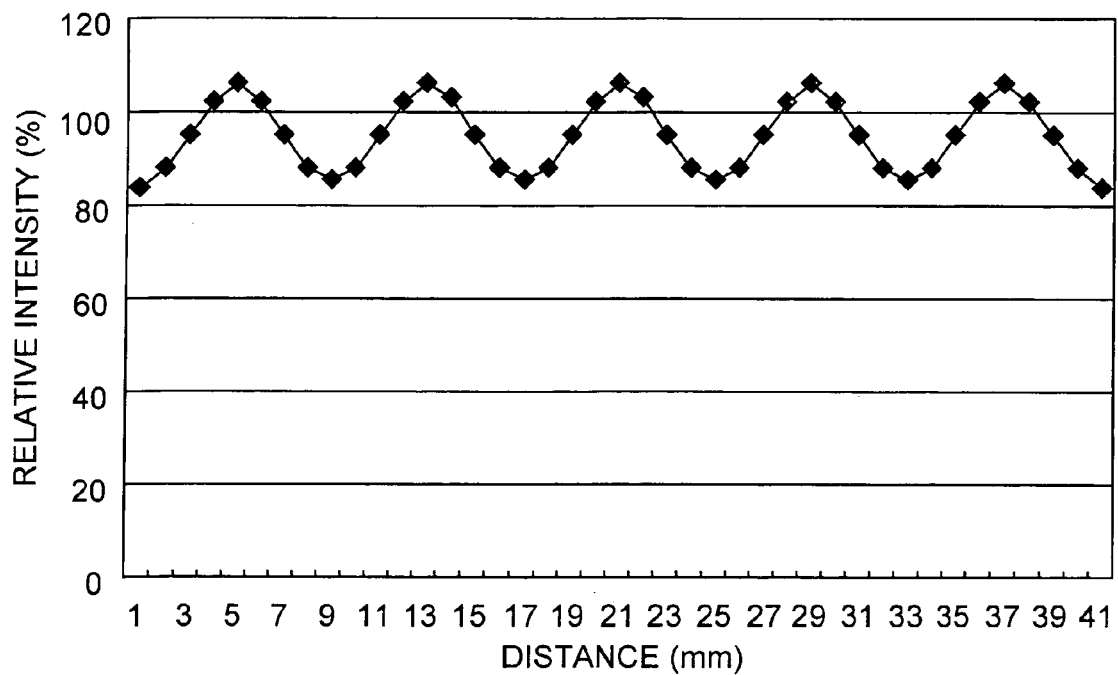
FIG. 21E is a graph for light intensity distribution on a document surface in a main scanning direction for Comparison Example 10.

FIGS. 21D and 21E show a light intensity distribution for a configuration for Comparative Example 10, which is compared with the above-mentioned Example 10.

Comparative Example 10 has the following conditions, wherein the configuration of Comparative Example 10 is similar to the configuration of Example 10 except for an omission of the light-guiding member.

Comparative Example 10

LED array: same as Example 10

Light-guiding member: not provided

Components Arrangement:
  Distance from "light-guiding member" to "document-contact face": 6 mm
  Angle defined by light-emitting direction and normal line from "document-contact face": 30°

Contact glass: same as Example 10

Document-contact face: same as Example 10

FIG. 21D shows a light intensity distribution in the sub-scanning direction for Comparative Example 10, and FIG. 21E shows a light intensity distribution in the main scanning direction for Comparative Example 10.

As shown in FIG. 21D, Comparative Example 10 has an unevenness of the light intensity in the main scanning direction for approximately 22.1%, which is not favorable for color image processing.

Figure 21F:
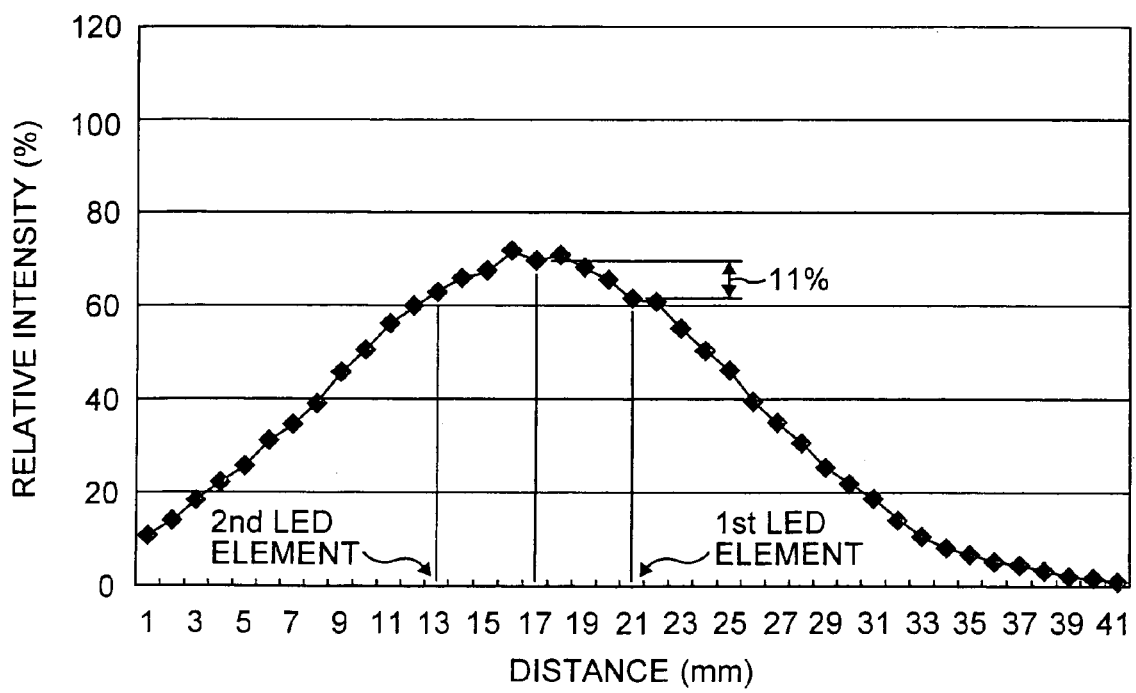
FIG. 21F is a graph for light intensity distribution on a document surface in a main scanning direction for Example 10, in which light intensity distribution is formed with two adjacent LED elements.

FIG. 21F shows a light intensity distribution in the main scanning direction using the configuration of Example 10, in which only two adjacent LED elements 401 are emitted and the light intensity distribution formed by the two adjacent LED elements 401 is shown.

Assume that a first LED 401 is located at the center position in the main scanning direction (i.e., the first LED 401 is located at a 21 mm-position from the edge of the document-contact face 404) and a second LED 401 is located adjacently to the first LED 401. The first LED 401 emits a first primary light beam to a first point on the document-contact face 404, and the second LED 401 emits a second primary light beam to a second point on the document-contact face 404.

FIG. 21F shows a light intensity distribution in the main scanning direction of the document-contact face 404, and the light intensity at the first and second points are smaller than a light intensity at a center point between the first and second points. Specifically, the light intensity on the document-contact face 404 at the first and second points is smaller lower than the light intensity at the center point between the first and second points by approximately 11.7%. In other words, a light intensity difference between the center point and the first and second points is approximately 12%.

Such a light intensity difference can be reduced by making a LED pitch longer than the above-mentioned LED pitch for Example 10 (i.e., 8 mm).

In the above FIG. 21F, the light intensity distribution is formed with only the two adjacent LED elements 401. However, an actual light-source unit includes a plurality of LED elements provided adjacently one by one to the above-mentioned first and second LED elements 401. Therefore the light intensity of each of LED elements 401 may be superimposed to the light intensity at the first and second points.

The light intensity of the plurality of LED elements 401 contribute to the light intensity at the first and second points compared to the light intensity of the center point between the first and second points. Therefore, the light intensity difference at the center point and the first or second point can become smaller.

Generally, an output power of LED element 401 is expressed with a light intensity of the LED element 401. Specifically, a marketed LED element has a light intensity of from 125 to 860 mcd (millicandela) for a forward current of from 10 to 30 mA.

Accordingly, the LED element having an output power of 10 mW is used in Examples of the present invention, for example.

As above-mentioned, with an advancement of studies on LED element, light intensity for LED elements has been increasing.

When an LED element having higher light intensity is to be employed for a light-source unit, a number of LED elements to be provided in the light-source unit can be reduced. At the same time, when the LED element having higher light intensity is to be employed for the light-source unit, a method for reducing the unevenness of light intensity distribution described in the present disclosure is further required.

Example 11

Example 11 has a similar configuration as in Example 10 except some changes such as size of the light-guiding member 402.

LED Array:
  LED Number: 11
  Arrangement: one line in main scanning direction
  Pitch: 5 mm
  Light distribution: Lambert distribution
  Output power: 10 mW per one LED
  Light-emitting face: 0.5×0.5 mm (having uniform light intensity distribution)

Light-Guiding Member:
  Length×width×thickness: 100×5×1 mm
  Refraction index: nd=1.517
  Face 402e and 402f: mirror face (reflection rate 100%)

Components Arrangement:
  Distance from "light-guiding member" to "document-contact face": 8 mm
  Angle defined by light-emitting direction and normal line from document-contact face: 30°

Contact glass: Same as Example 10

Document-contact face: Same as Example 10

When light beams reflect in the light-guiding member 402 more and more, the light intensity distribution in the sub-scanning direction can become more uniform because the light beams can be superimposed more and more.

To achieve such uniform light intensity distribution, the light-guiding member 402 preferably has a thickness "ε," which is smaller than a width "L" of the light-guiding member 402 (i.e., a distance between the face 402a and the face 402b of the light-guiding member 402).

Figure 22A:
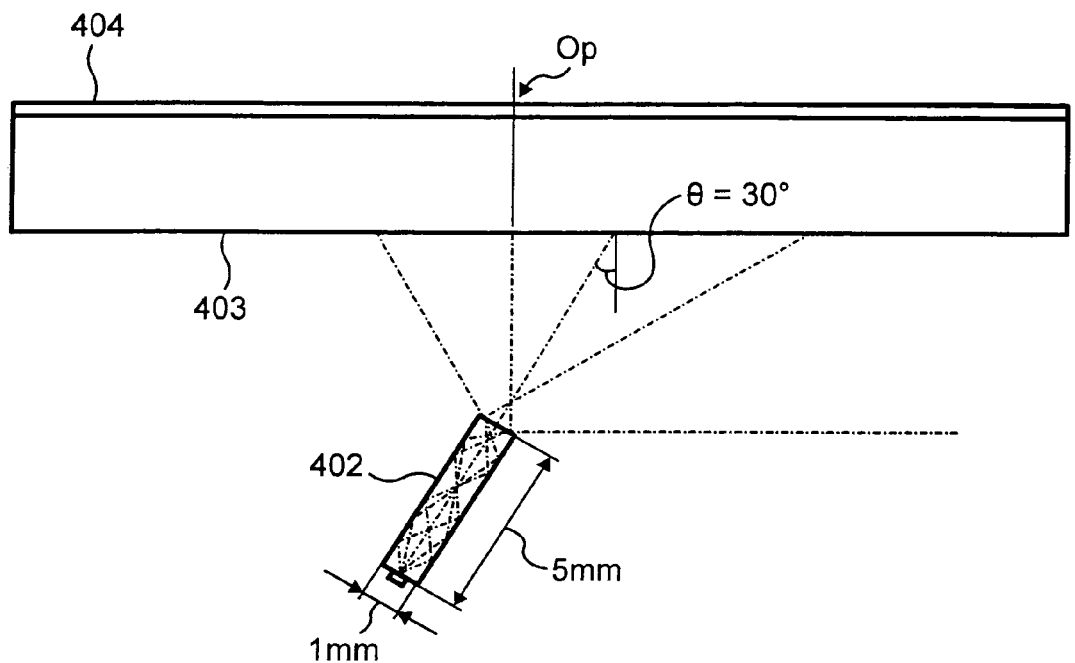
FIG. 22A is a schematic configuration for illumination according to an Example 11.
Figure 22B:
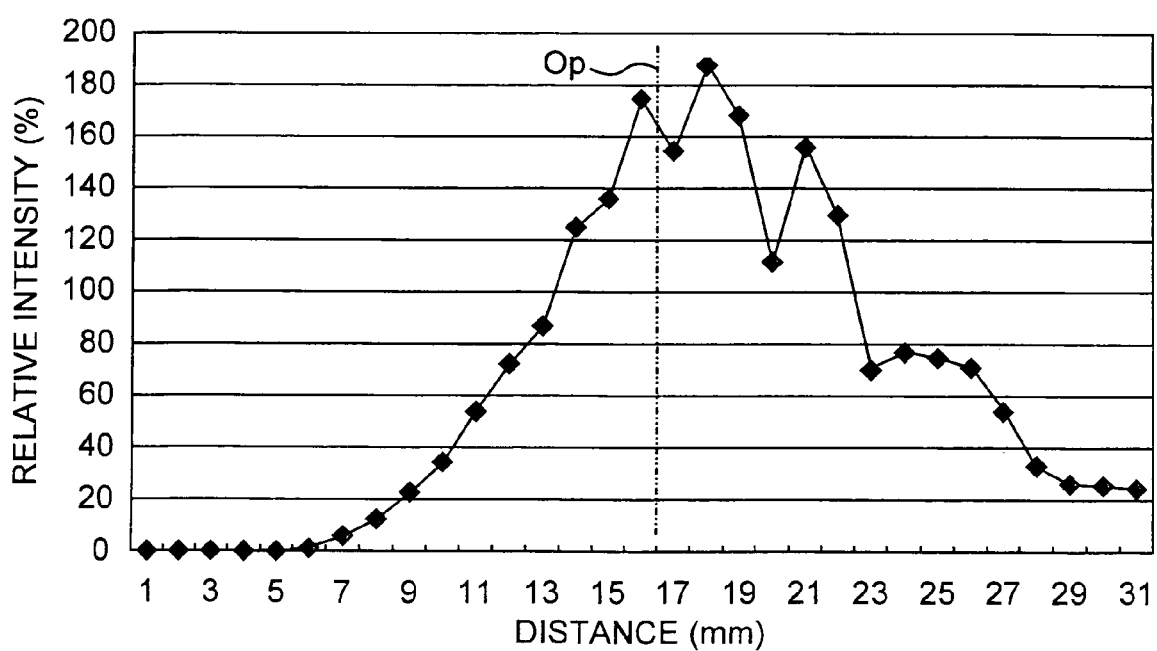
FIG. 22B is a graph for light intensity distribution on a document surface in a sub-scanning direction for Example 11.
Figure 22C:
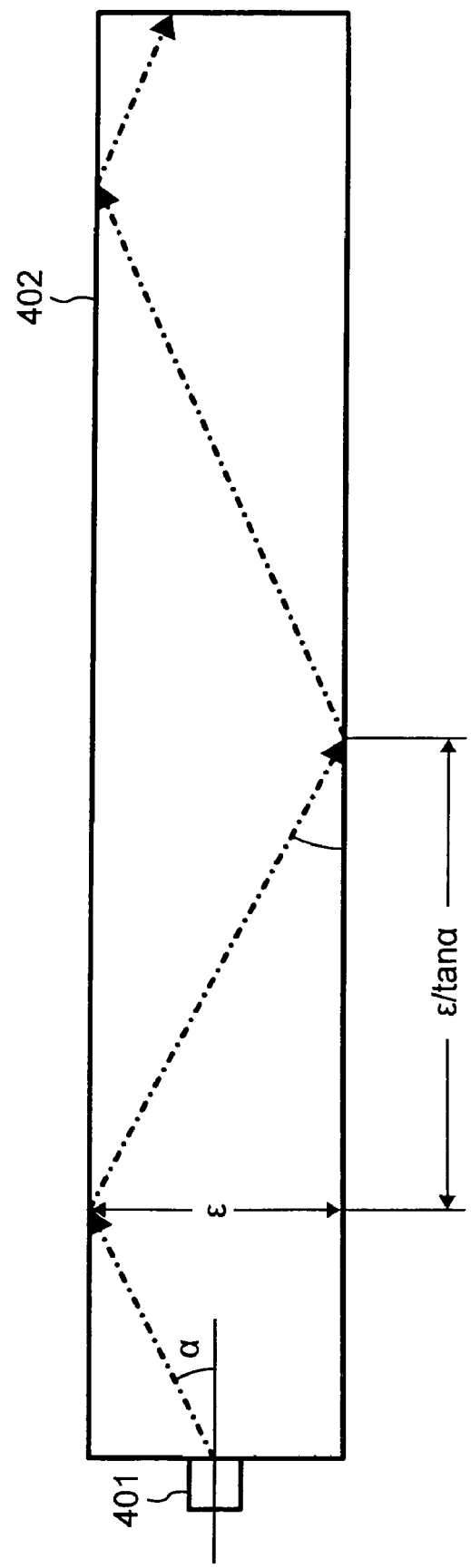
FIG. 22C is a schematic view of a light-guiding member and a light beam passing through the light-guiding member.

As shown in FIG. 22C, when a light beam emitted from the LED element 401 enters the light-guiding member 402 with an angle "α", and reflects "k" times in the light-guiding member 402, a following equation can be established.

$$L = k(\epsilon/\tan \alpha) \quad (1)$$

wherein the (ε/tan α) defines one-distance of a light beam passing through the light-guiding member 402 from the face 402a to the face 402b as shown in FIG. 22C.

In the equation (1), "k" can take any positive number including whole number because the width "L" can be set to any length.

As shown in the above FIG. 6C, the LED element 401 of the LED array is arranged at a position which aligns to the center of the light-guiding member 402. Therefore, the light beam is output from the face 402b with one reflection in the light-guiding member 402 when 0.5<k<1.5, and is output from the face 402b with three reflections in the light-guiding member 402 when 2.5<k<3.5.

If a half angle of the LED element 401 having a Lambert distribution is corresponded to the angle "α" of the light-guiding member 402, the angle "α" is obtained from following formula and conditions.

For example, from "sin α=sin 60°/nd" and "nd=1.517," "α"≈34.8° is obtained.

In Example 11, "L=5 mm" and "ε=1 mm" are set. Therefore k=L/(ε/tan α)≈3.48 is obtained.

On the other hand, the width "L" can be determined by designating the "k" at first.

FIG. 22A is a schematic view a configuration for Example 11. FIG. 22B is a light intensity distribution on the document-contact face in the sub-scanning direction for Example 11.

As shown in FIG. 22A, an original point "Op" is defined on the contact glass 404 as below for an explanation for a scanning area in the sub-scanning direction to be described later. A normal line is drawn from the face 402b (outgoing plane of the light-guiding member 402) to the contact glass 404 as shown in FIG. 22A. Then, a point where the normal line and the contact glass 404 cross each other is defined as the original point "Op." Although the original point "Op" comes to a center position in the sub-scanning direction as shown in FIGS. 22A and 22B and other drawings to be described later, the original point "Op" moves along the sub-scanning direction depending on a position of the LED array which itself moves for scanning an image on the contact glass 401.

In the drawings to be described later, the above-mentioned original point "Op" will be used in a similar manner.

The light beam emitted from the LED with a half angle of ±60° reflects three times in the light-guiding member 402, and is output from the outgoing plane of the light-guiding member 402 with an angle of ±60° with respect to the light-emitting direction.

In Example 11, the light-guiding member 402 is slanted against the contact glass 403 with an angle of 30° as shown in FIG. 22A. Therefore, one of the above-mentioned light beams emitted with the angle ±60° enters the contact glass 403 with an angle of 30°, and other light beams emitted with the angle ±60° do not enter the contact glass but go in a direction which is parallel to the contact glass 403.

In Example 11, the light intensity distribution in the sub-scanning direction has unevenness as shown in FIG. 22B. Therefore, even if a scanning area of 2-mm width is to be set at the center portion "Op" in the sub-scanning direction, a stable scanning area may not be set for the configuration having the light intensity distribution shown in FIG. 22B.

This may be caused by not-enough uniformity of the light intensity in the sub-scanning direction.

In Example 11, k=3.48, that is the light beam reflects three-times in the light-guiding member 402. Therefore, "k" needs to be set four or greater to improve uniformity of the light intensity in the sub-scanning direction.

Example 12

In Example 12, the light-guiding member 402 includes properties that enables k≈5.5.

Light-Guiding Member:
Length×width×thickness: 100×8×1 mm

Other conditions: Same as Example 11

From the size of the light-guiding member 402, "k" is calculated as k≈5.563.

Figure 23A:
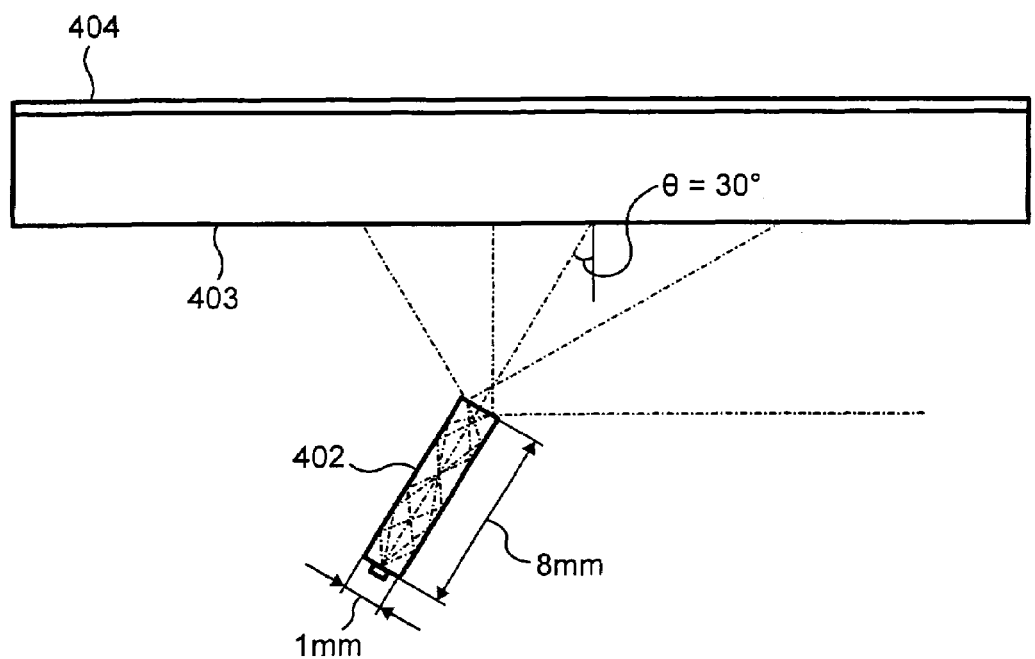
FIG. 23A is a schematic configuration for illumination according to an Example 12.
Figure 23B:
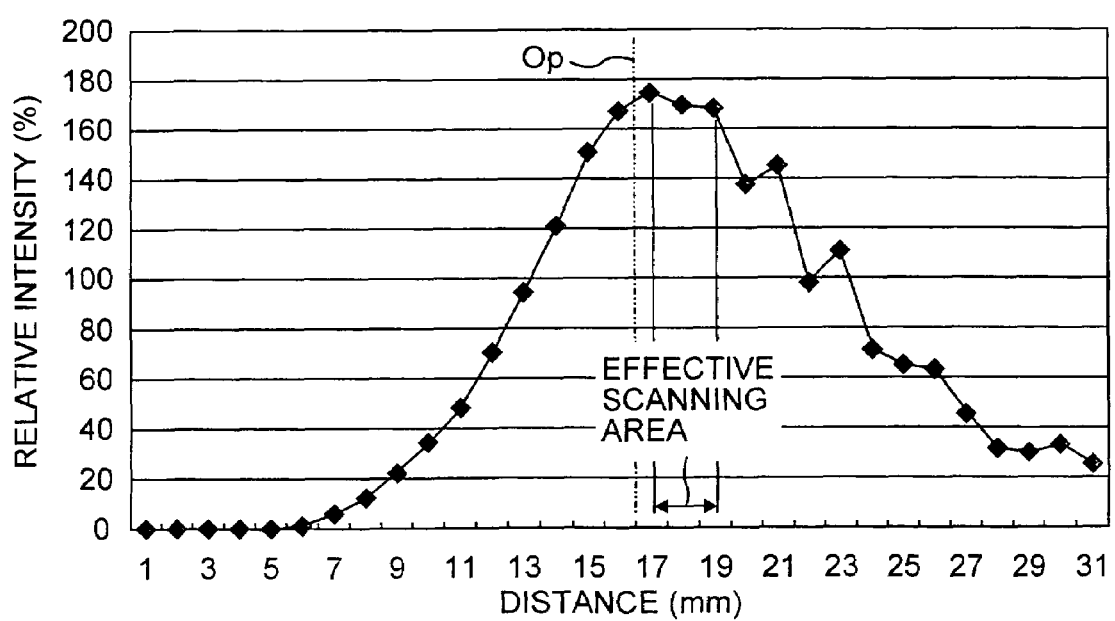
FIG. 23B is a graph for light intensity distribution on a document surface in a sub-scanning direction for Example 12.

FIG. 23A is a schematic view of a configuration for Example 12. FIG. 23B shows a light intensity distribution on the document-contact face 404 in the sub-scanning direction for Example 12.

As shown in FIG. 23B, in Example 12, a light intensity unevenness of an effective scanning area (e.g., 2-mm width) to be used as scanning area is within approximately 4.0%.

Example 13

In Example 13, the light-guiding member 402 has a thickness and length as below, which are larger than those in Example 12.

Light-Guiding Member:
Length×width×thickness: 100×9.5×2 mm

Other conditions: same as Example 11

Under such conditions, "k" is calculated as k≈3.3, which is smaller than that of Example 11, thereby the light intensity unevenness in the sub-scanning direction may further increase.

Figure 24A:
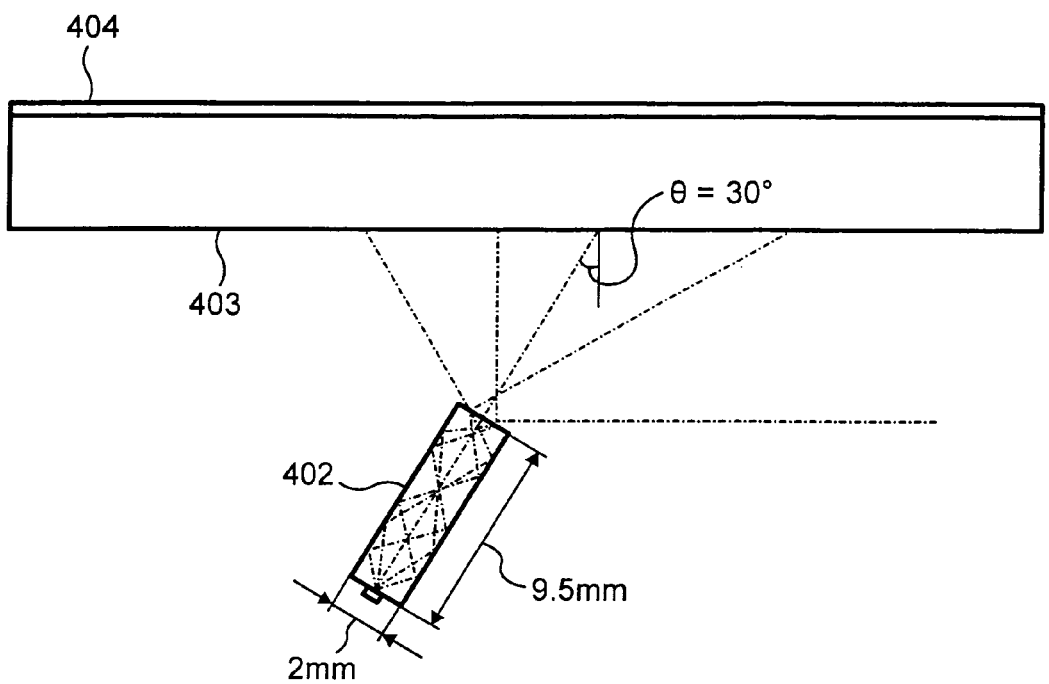
FIG. 24A is a schematic configuration for illumination according to an Example 13.
Figure 24B:
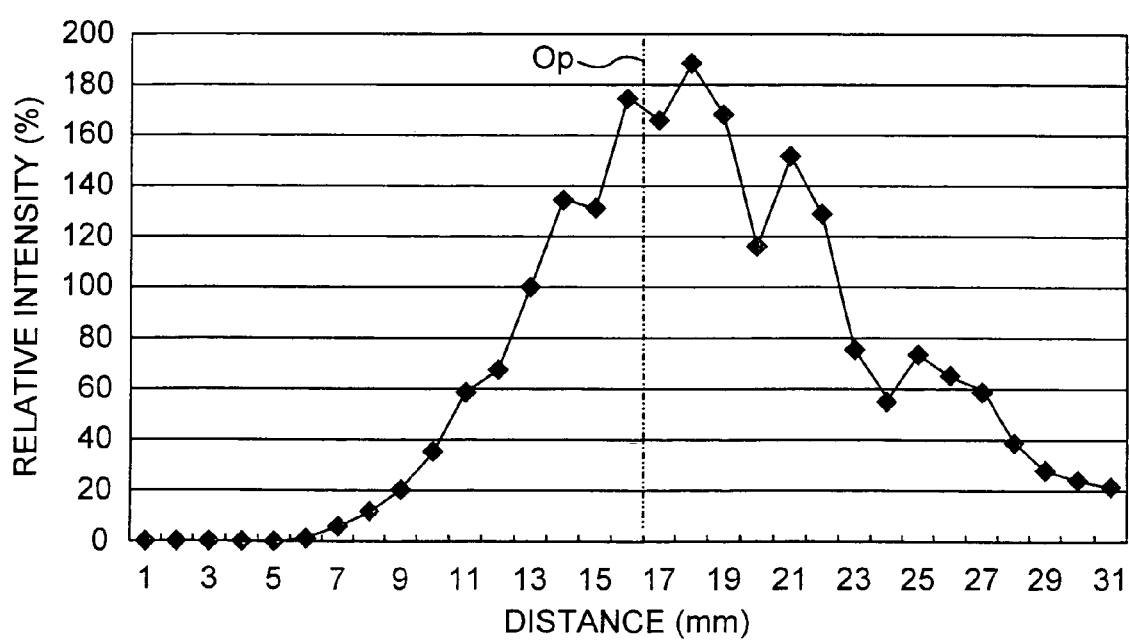
FIG. 24B is a graph for light intensity distribution on a document surface in a sub-scanning direction for Example 13.

FIG. 24A shows a schematic view for a configuration for Example 13. FIG. 24B shows a light intensity distribution on the document-contact face in the sub-scanning direction for Example 13. The light intensity distribution shown in FIG. 24B is similar to the light intensity distribution shown in FIG. 22B.

Example 14

In Example 14, the light-guiding member has a length as below, which is larger than that in Example 13.

Light-Guiding Member:
Length×width×thickness: 100×12×2 mm

Other conditions: same as Example 10

Under such conditions, "k" is calculated as k≈4.2, which corresponds to a four-times reflection.

Figure 25A:
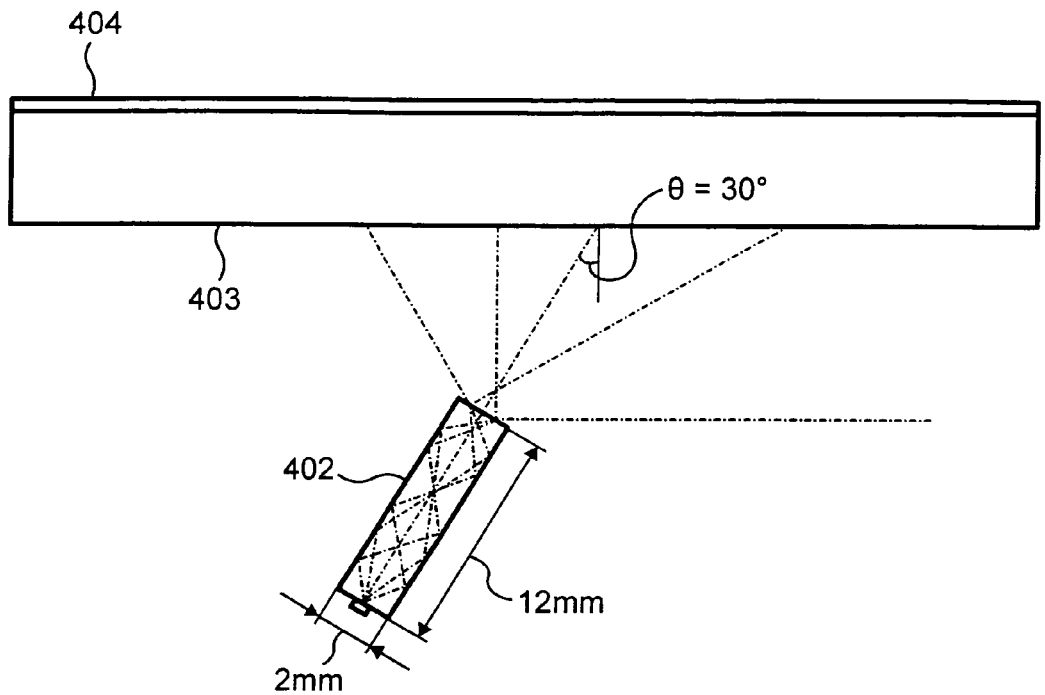
FIG. 25A is a schematic configuration for illumination according to an Example 14.
Figure 25B:
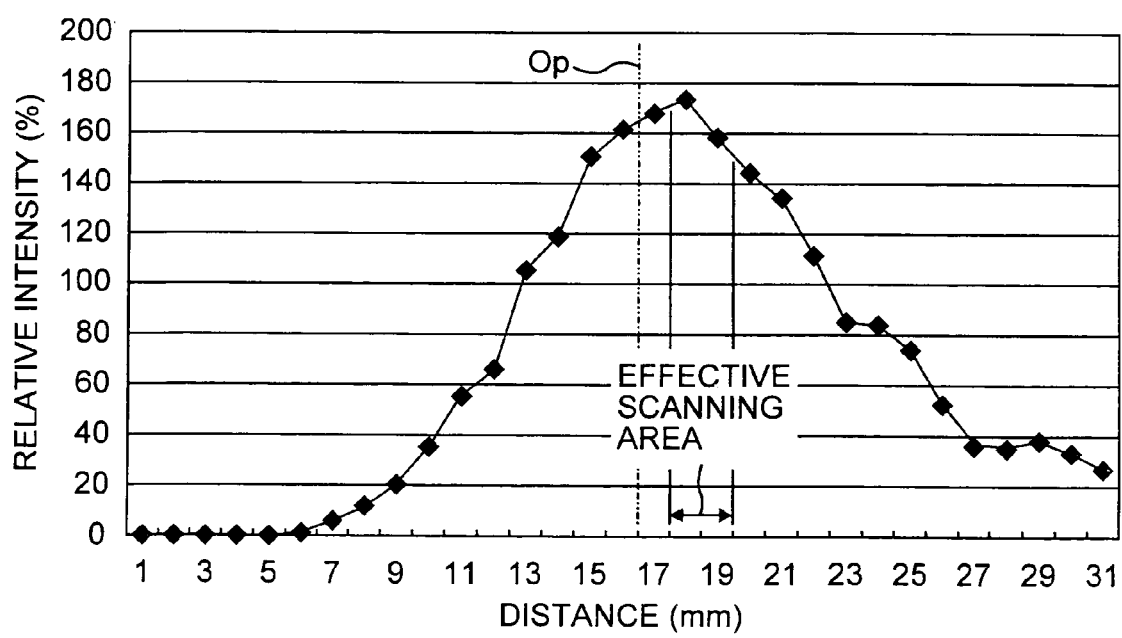
FIG. 25B is a graph for light intensity distribution on a document surface in a sub-scanning direction for Example 14.

FIG. 25A is a schematic view for a configuration for Example 14. FIG. 25B shows a light intensity distribution on the document-contact face in the sub-scanning direction for Example 14.

As shown in FIG. 25B, even if the thickness of the light-guiding member 402 is increased, the light intensity unevenness can be reduced (e.g., approximately 3.0% in FIG. 25B) by increasing the width of the light-guiding member 402.

Figure 26A:
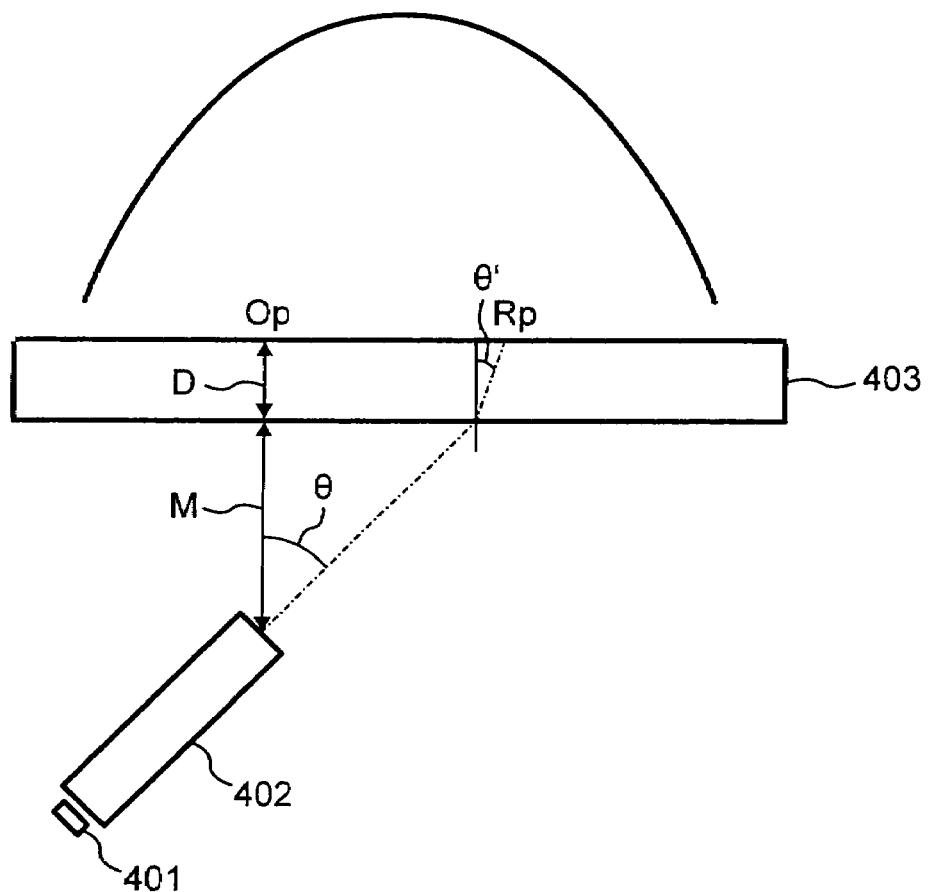
FIGS. 26A and 26B show a schematic configuration for a light-source unit, a light-guiding member, and a contact glass.
Figure 26B:
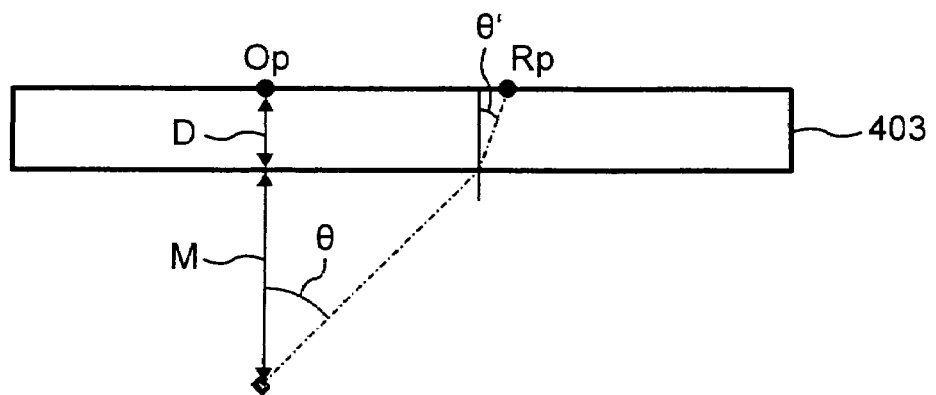

FIGS. 26A and 26B show a schematic view for a configuration which explains an arrangement relationship between the light-guiding member 402 and the contact glass 403.

As shown in FIG. 26A, the contact glass 403 has a thickness "D", and the light-guiding member 402 has an angle θ with respect to a normal line from a surface of the contact glass 403. As shown in FIG. 26A, the light-guiding member 402 is positioned below the lower surface of the contact glass 403, and the outgoing plane of the light-guiding member 402 comes to a position with a distance "M" from the lower surface of the contact glass 403. The light beam enters the contact glass 403 with an angle θ and deflects with an angle θ' in the contact glass 403.

FIG. 26B shows a schematic view, in which the light beam is assumed to diffuse from the outgoing plane of the light-guiding member 402, and the center of the outgoing plane of the light-guiding member 402 is assumed as a light-source point.

As above-explained the point "Op" is assumed on the contact glass 402 as shown in FIG. 26B.

The light intensity on the document-contact face 404 inversely relates to a square of the light beam path-length, and are proportional to the Lambert distribution.

Although the light intensity along a line defining the angle θ has a maximum light intensity according to the Lambert distribution, a light beam path-length from the light-guiding member 402 to the point "Op" on the contact glass 403 is shorter than other light-beam path length, and thereby the light intensity at the point "Op" is brighter than other point.

Therefore, as shown in FIG. 26A, the light intensity distribution generally has a peak value between the point "Op" and a point "Rp" on the contact glass 403, wherein the point "Rp" receives light deflected at the contact glass 402 with the angle θ'.

A scanning direction is perpendicular with respect to the contact glass 403. Therefore, the point "Op" cannot be scanned because the light-guiding member 402 hinders a reflection from the point "Op." Specifically, an area defined by "(ε/2)×cos θ" is hindered by the light-guiding member 402, thereby such an area cannot be used for scanning.

As for the effective scanning area, at least 2-mm width is preferably set. Thereby, the at least 2-mm width having a peak value between the point "Op" and the point "Rp" on the contact glass 403 may be used for the effective scanning area.

Such a condition can be expressed as (2) below.

$$M\tan θ + D\tan θ' - (ε/2)×\cos θ \geq 2 \quad (2)$$

If the angle θ for the light-guiding member 402 is too small, the above-mentioned effective scanning area may not be secured because such light-guiding member 402 will come to a position which hinders an effective scanning area.

Based on simulations for light intensity distribution conducted under a condition of "M+D≧6," it is found that "θ≧20° is preferable.

In FIG. 26B, the outgoing plane (having the thickness "ε" mm) of the light-guiding member 402 is assumed as a light-source point.

If the thickness "ε" is not zero, the light intensity distribution in such a case may differ from the light intensity distribution for the light-source point (i.e., ε=zero). However, under a condition of "ε≦3(mm)," it has been found that the light intensity distribution for both cases (i.e., ε=zero and ε≠zero) has no significant difference for practical use.

Example 15

Example 15 has following conditions.

Light-Guiding Member:
  Length×width×thickness: 100×12×2 mm

Components Arrangement:
  Distance from "light-guiding member" to "document-contact face": M+D=7 mm
  Angle defined by light-emitting direction and normal line from document-contact face: 20°

Other conditions: same as Example 14
  Under such conditions, following values are obtained.

$$M\tan θ + D\tan θ' \approx 2.12 \text{ mm}$$

$$(ε/2)×\cos θ \approx 0.94$$

Therefore, a following value is obtained.

$$M\tan θ + D\tan θ' - (ε/2)×\cos θ \approx 1.2 \text{ mm}$$

Because the above-value "1.2 mm" is smaller than 2 mm set in the formula (2), Example 15 does not satisfy the condition of the formula (2).

Figure 27A:
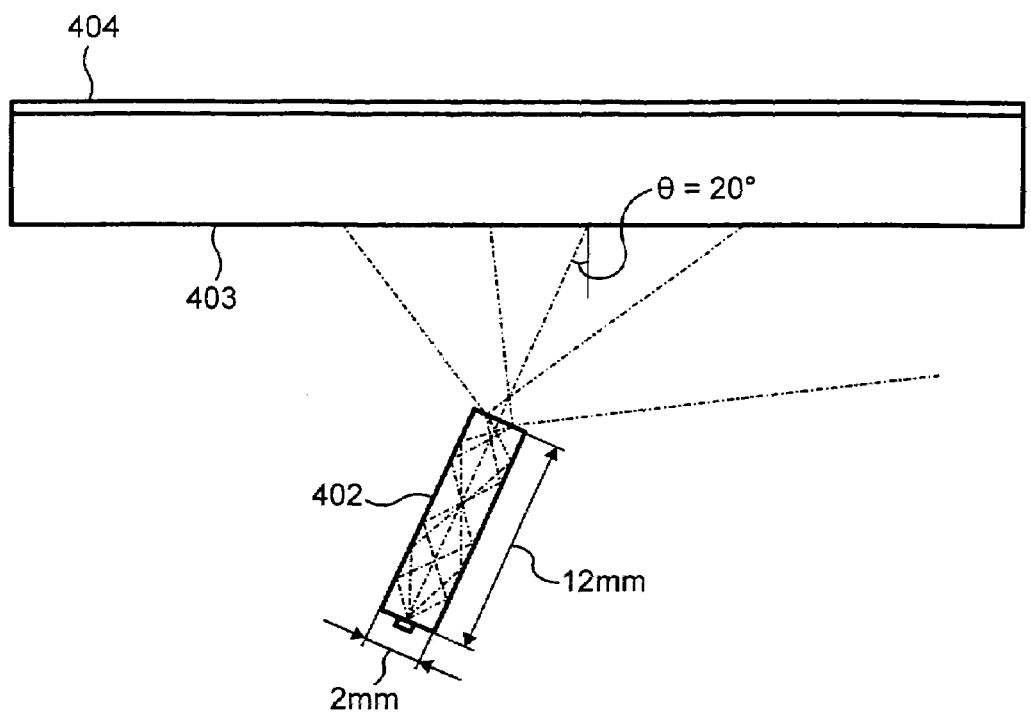
FIG. 27A is a schematic configuration for illumination according to an Example 15.
Figure 27B:
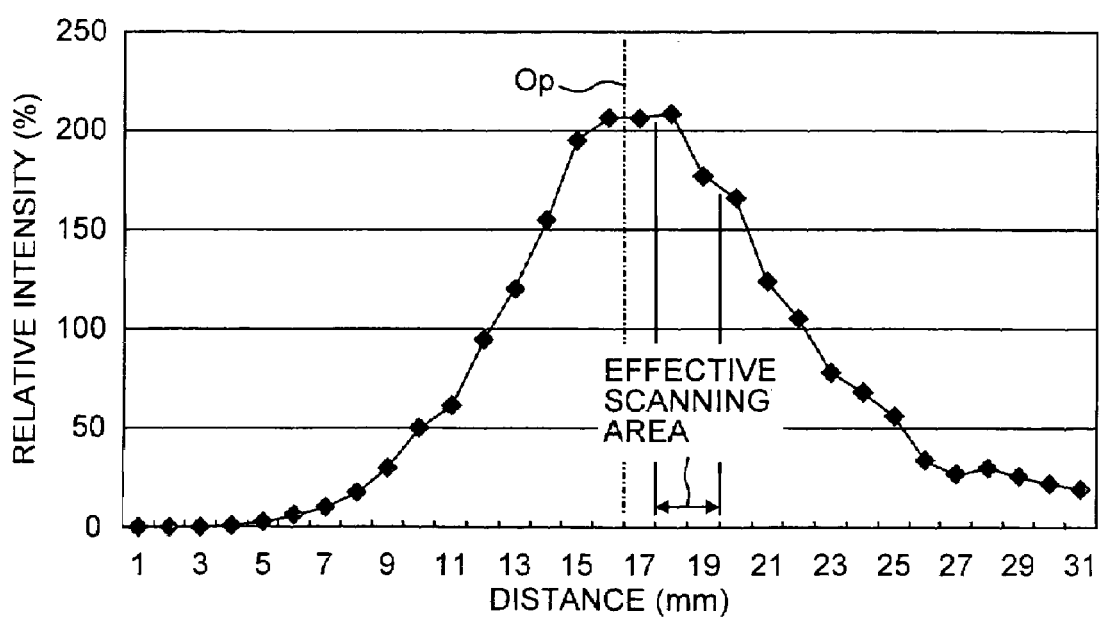
FIG. 27B is a graph for light intensity distribution on a document surface in a sub-scanning direction for Example 15.

FIG. 27A is a schematic view for a configuration for Example 15. FIG. 27B shows a light intensity distribution on the document-contact face in the sub-scanning direction for Example 15.

In Example 15, the point "Rp" locates from the point "Op" by approximately 2.12 mm, and thereby a peak value of the light intensity distribution in the sub-scanning direction comes within the 2.12 mm-area from the point "Op." Therefore, a width required for effective scanning area is approximately 3-mm width from the point "Op."

However, as shown in FIG. 27B, the light intensity unevenness in such an area is over 15%, which is not favorable.

Example 16

Example 16 has a configuration similar to the above-mentioned configuration for Example 15 except an arrangement change of the light-guiding member 402.

Components Arrangement:
  Distance from "light-guiding member" to "document-contact face": M+D=7 mm
  Angle defined by light-emitting direction and normal line from document-contact face: 30°

Other conditions: same as Example 15

Figure 28A:
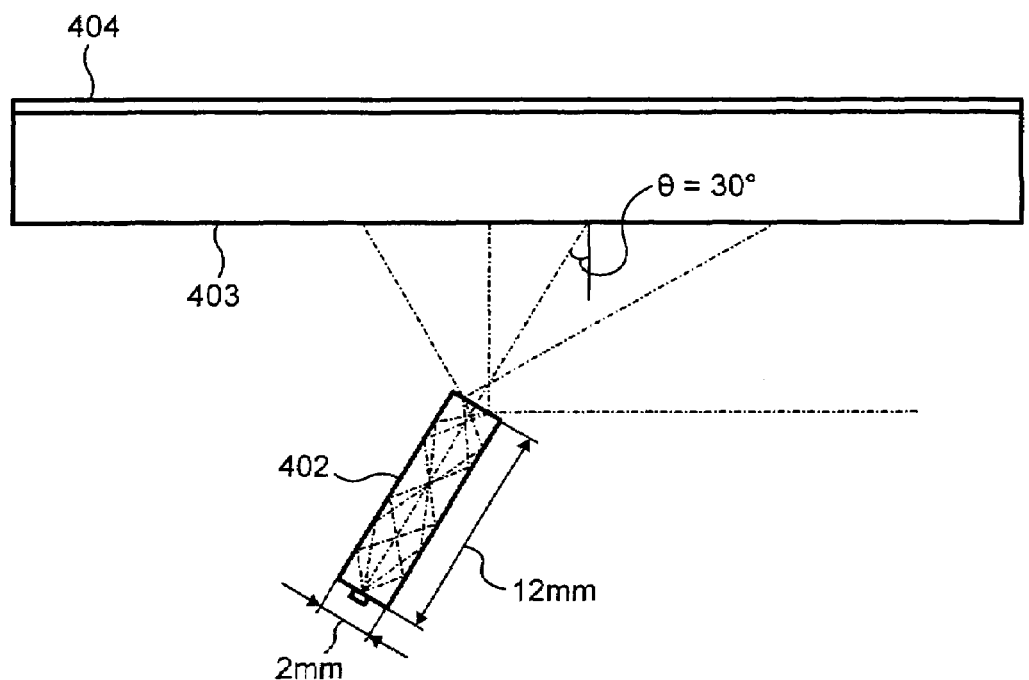
FIG. 28A is a schematic configuration for illumination according to an Example 16.
Figure 28B:
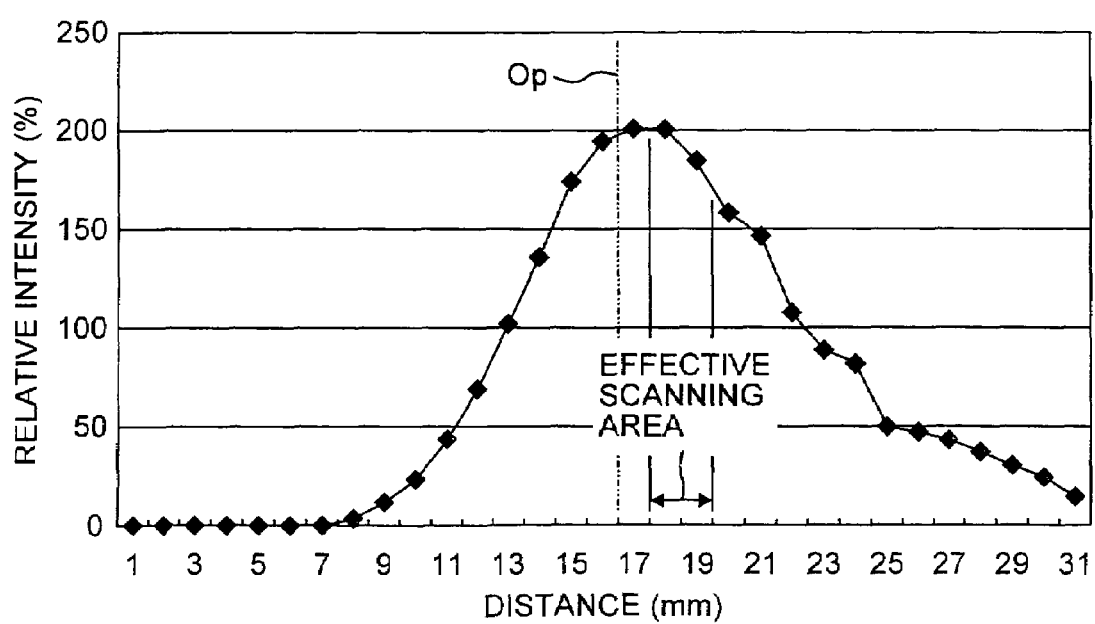
FIG. 28B is a graph for light intensity distribution on a document surface in a sub-scanning direction for Example 16.

FIG. 28A is a schematic view for a configuration for Example 16. FIG. 28B shows a light intensity distribution on the document-contact face in the sub-scanning direction for Example 16.

Under such conditions, the following values are obtained.

$$M\tan θ + D\tan θ' \approx 3.31 \text{ mm}$$

$$(ε/2)×\cos θ \approx 0.87$$

Therefore, a following value is obtained.

$$M\tan θ + D\tan θ' - (ε/2)×\cos θ \approx 2.45 \text{ mm}$$

Because the above-value "2.45 mm" is larger than 2 mm set in the formula (2), Example 16 satisfies the condition of the formula (2).

As shown in FIG. 28B, the light intensity unevenness in the 2-mm effective scanning area in the sub-scanning direction is approximately 7.8%, and thereby such an area can be used as a scanning area.

The above-described Examples employ the light-guiding member 402 made of glass. However, the light-guiding member 402 made of glass may experience breakage when making the light-guiding member 402 having a thickness 1 to or 2 mm.

Therefore, the light-guiding member 402 may be made of a transparent resinous material. If the transparent resinous material is used, the refraction index of the transparent resinous material becomes smaller than the refraction index of glass (e.g., 1.517) used in the Examples. For example, polytetrafluoroethylene has a refraction index of "nd" of from 1.35 to 1.38.

As above-described, the refraction index of materials is one condition for making the light-guiding member 402, and there is no limitation to the types of materials to be used. Therefore, the light-guiding member 402 can use materials including glass, transparent resinous material or the like. In a similar manner, the contact glass can use materials including glass, transparent resinous material or the like.

Accordingly, although the contact glass uses a glass having the refraction index of "nd=1.517" in the above-described Examples, the contact glass can also use a material having the above-mentioned refraction index of "nd=1.35," for example.

Furthermore, the light-guiding member 402 can include air having a refraction index of "1" as a medium.

If the medium is air, the light-guiding member 402 may only need reflection faces at its sides, and a light-beam incidence side and a light-beam outgoing side may be opening portions having no planes. However, to prevent a deposition of foreign materials such as dust to the reflection faces, the above-mentioned opening portions are preferably sealed by covers, wherein such covers are made of transparent member to allow the light beam to pass therethrough.

In this case, a formula that corresponds to the above-described formula (1) can be expressed as below formula (3).

$$k = (L'/\epsilon') \times \tan \alpha' \quad (3)$$

wherein $L'$ is a width of the light-guiding member 402, $\epsilon'$ is a distance of two reflection faces, and $\alpha'$ is half angle of the LED element.

Furthermore, a formula that corresponds to the above-described formula (2) can be expressed as below formula (4).

$$M \tan \theta + D \tan \theta' - (\epsilon'/2) \times \cos \theta \geq 2 \quad (4)$$

Hereinafter, a light source, which can be used for the above-mentioned Examples, is explained.

In the above-mentioned Examples, an LED (light emitting diode) element is preferably used as the light source. More specifically, a white LED is preferably used to scan a variety of documents. The white LED includes a plurality of types. One type of the white LED element is a one-chip type using a phosphor, and another type is a multiple-chip type having two chips and not using a phosphor.

As for the one-chip type, a chip (i.e., emitter) is sealed in a transparent sealing material containing YAG phosphor (yttrium-aluminum-garnet phosphor). The chip includes InGaN (indium-gallium-nitride) and emits a blue light. When the chip emits the blue light, the YAG phosphor is excited and emits a yellow light. Because the blue and yellow are complementary light colors, the one-chip white LED element can emit a white light.

On one hand, as for the multiple-chip type having two chips, the two chips emit different colors and a white light is emitted by mixing the different colors. Specifically, a plurality of chips are arranged on a same plane, and when different colors emitted from the plurality of chips and mixed, the multiple-chip type having two chips can emit a white light. For example, when two chips are used, the two chips include a chip emitting a blue light and a chip emitting a yellow light. Furthermore, when three chips are used, the three chips include a chip emitting a red light, a chip emitting a blue light, and a chip emitting a green light, for example.

In general, when a plurality of color lights emitted from chips, the plurality of color lights are mixed as white light, and the LED element can emit a white light.

In some cases, the plurality of color lights are not mixed completely in the LED element. However, in such cases, a substantially white light can be emitted from the light-guiding member because the lights emitted from the LED element reflect for a plurality of times in the light-guiding member.

The above-described document lighting unit can be used in an image scanning unit and such image scanning unit can be incorporated in an image forming apparatus.

Numerous additional modifications and variations are possible in light of the above teachings. It is therefore to be understood that within the scope of the appended claims, the disclosure of the present invention may be practiced otherwise than as specifically described herein.

This application claims priority from Japanese patent applications No. 2004-194822 filed on Jun. 30, 2004, and No. 2004-194811 filed on Jun. 30, 2004 in the Japan Patent Office, the entire contents of each of which are hereby incorporated by reference herein.

The invention claimed is:

1. An image scanning unit configured to read a document, comprising:

a document-contact face having a first side in a main scanning direction and a second side in a sub-scanning direction;

a light-source unit configured to array a plurality of light-emitting elements in the main scanning direction with a pitch to emit light beams to the document-contact face; and a light-guiding member, having a plurality of planes, provided between the light-source unit and the document-contact face and configured to guide the light beams from the plurality of light-emitting elements to the document-contact face, the light-guiding member having a length in the main scanning direction which is defined with the pitch of the plurality of light-emitting elements, and a length of the document-contact face and the light-source unit in the main scanning direction, wherein the length of the document-contact face is Wp in the main scanning direction, the length of the light-source unit is W1 in the main scanning direction, the length of the light-guiding member is Wg in the main scanning direction, and the pitch of the light-emitting elements is Pl, to satisfy relationships Wp<Wg, and W1 <Wg≦W1+Pl, in which center positions of the document-contact face, the light-guiding member, and the light-source unit in the main scanning direction are matched.

2. The image scanning unit according to claim 1, wherein the plurality of planes include a first plane configured to receive the light beams from the plurality of light-emitting elements, a second plane configured to emit the light beams to the document-contact face, and the plurality of planes other than the first and second planes are formed as mirror faces to reflect the light beams that reach thereon.

3. The image scanning unit according to claim 2, wherein the plurality of planes other than the first and second planes are not mirror faces when a transparent member is formed of a material having a refraction index of 1.414 or greater with respect to a longer wavelength side of visible light.

4. The image scanning unit according to claim 1, further comprising:

a photoelectric converter configured to convert the light beams reflected from a document through the document-contact face to an image signal; and a focusing unit configured to focus the light beams reflected from the document onto the photoelectric converter, wherein the plurality of light-emitting elements satisfy relationships $I(n) \leq I(0)$ and $I(n) \leq 4 \times I(0)$, in which $I(0)$ is a light intensity of a light-emitting element located at a center of the light-source unit, $I(n)$ is a light intensity of a light-emitting element located at an n-th position from the light-emitting element located at the center of the light-source unit, and n is one or greater.

5. The image scanning unit according to claim 1, further comprising:

a photoelectric converter configured to convert the light beams reflected from a document through the document-contact face to an image signal; and a focusing unit configured to focus the light beams reflected from the document onto the photoelectric converter, wherein the plurality of light-emitting elements satisfy relationship $PI(0) \geq PI(n-1) \geq PI(n)$, in which $PI(0)$ is a pitch between an light-emitting element at a center of the light-source unit and its adjacent light-emitting element, $PI(n)$ is a pitch between a light-emitting element at an n-th position from the light-emitting element located at the center of the light-source unit and its adjacent light-emitting element, and n is one or greater.

6. An image forming apparatus, comprising:
the image scanning unit as claimed in claim 1.

7. An image scanning unit configured to read a document, comprising:

a document-contact face having a first side in a main scanning direction and a second side in a sub-scanning direction;

a light-source unit configured to array a plurality of light-emitting elements in the main scanning direction with a pitch to emit light beams to the document-contact face; and a light-guiding member, having a plurality of planes, provided between the light-source unit and the document-contact face and configured to guide the light beams from the plurality of light-emitting elements to the document-contact face, and, wherein the plurality of light-emitting elements include a first light-emitting element having a first light intensity and a second light-emitting element having a second light intensity, which are adjacent to each other, and the first and second light-emitting elements emit a first primary light beam and a second primary light beam onto a first point and a second point on the document-contact face, respectively, a third point which is set at a center between the first and second points has a third light intensity, and a difference of the first or second light intensity, whichever is larger, and the third light intensity is within 12%.

8. The image scanning unit according to claim 7, wherein the plurality of light-emitting elements include a first light-emitting element having a first light intensity and a second light-emitting element having a second light intensity, which are adjacent to each other, the first and second light-emitting elements emit a first primary light beam and a second primary light beam onto a first point and a second point on the document-contact face, respectively, a third point which is set at a center between the first and second points has a third light intensity, and a difference of the first or second light intensity, whichever is larger, and the third light intensity is within 12%.

9. An image forming apparatus, comprising:

the image scanning unit as claimed in claim 7.

10. The image scanning unit according to claim 7, wherein the plurality of planes include a first plane configured to receive the light beams from the plurality of light-emitting elements, a second plane configured to emit the light beams, and two reflection planes extended in parallel from the first plane to the second plane, and the light-guiding member forms a predetermined angle with the document-contact face when viewing the light-guiding member from the sub-scanning direction of the document-contact face.

11. An image scanning unit configured to read a document, comprising:

a document-contact face having a first side in a main scanning direction and a second side in a sub-scanning direction:

a light-source unit configured to array a plurality of light-emitting elements in the main scanning direction with a pitch to emit light beams to the document-contact face: and a light-guiding member, having a plurality of planes, provided between the light-source unit and the document-contact face and configured to guide the light beams from the plurality of light-emitting elements to the document-contact face, and the plurality of planes including a first plane configured to receive the light beams from the plurality of light-emitting elements, a second plane configured to emit the light beams, and two reflection planes extended parallel from the first plane to the second plane, the light-guiding member forms a predetermined angle with the document-contact face when viewing the light-guiding member from the sub-scanning direction of the document-contact face, and a contact glass having a predetermined thickness and provided between the document-contact face and the light-guiding member, and the contact glass and the light-guiding member satisfy a relationship $M \tan \theta + D \tan \theta' - (\epsilon/2) \times \cos \theta \geq 2$ wherein D is a thickness of the contact glass, M is a distance from a top surface of the contact glass to the second plane of the light-guiding member, $\theta$ is an angle with which the light beam enters the contact glass, $\theta'$ is an angle with which the light beam deflects, and $\epsilon$ is a thickness of the light-guiding member.

12. The image scanning unit according to claim 11, wherein the light-guiding member and the contact glass satisfy $D \geq 2$ and $\theta \geq 20°$.

13. An image forming apparatus, comprising:
the image scanning unit as claimed in claim 11.

14. An image scanning unit configured to read a document, comprising:
- a document-contact face having a first side in a main scanning direction and a second side in a sub-scanning direction;
- a light-source unit configured to array a plurality of light-emitting elements in the main scanning direction with a pitch to emit light beams to the document-contact face; and
- a light-guiding member, having a plurality of planes, provided between the light-source unit and the document-contact face and configured to guide the light beams from the plurality of light-emitting elements to the document-contact face, and
- the plurality of planes including a first plane configured to receive the light beams from the plurality of light-emitting elements, a second plane configured to emit the light beams, and two reflection planes extended parallel from the first plane to the second plane, the light-guiding member forms a predetermined angle with the document-contact face when viewing the light-guiding member from the sub-scanning direction of the document-contact face, and
- wherein the light-guiding member includes a width L', a thickness $\epsilon'$, and a deflection angle $\alpha'$ corresponding to a half angle of a light beam for a light-emitting element, wherein L'/$\epsilon'$ is set to a value that satisfies a constant k to 3.5 or greater, wherein k is a number of times that the light beam reflects in the light-guiding member and is expressed by k=(L'/$\epsilon'$)×tan $\alpha'$.

15. The image scanning unit according to claim 14, further comprising:
- a contact glass having a predetermined thickness and provided between the document-contact face and the light-guiding member, and the contact glass and the light-guiding member satisfy a relationship M tan $\theta$+D tan $\theta'$−($\epsilon'$/2)×cos $\theta \geqq 2$ wherein D is a thickness of the contact glass, M is a distance from a top surface of the contact glass to the second plane of the light-guiding member, $\theta$ is an angle with which the light beam enters the contact glass, $\theta'$ is an angle with which the light beam deflects, and $\epsilon'$ is a thickness of the light-guiding member.

16. The image scanning unit according to claim 14, wherein the light-guiding member includes a material having a refraction index of nd of 1.35 or greater for a d-line having a wavelength of 587.56 nm.

17. An image forming apparatus, comprising:
the image scanning unit as claimed in claim 14.

18. An image scanning unit configured to read a document comprising:
- a document-contact face having a first side in a main scanning direction and a second side in a sub-scanning direction;
- a light-source unit configured to array a plurality of light-emitting elements in the main scanning direction with a pitch to emit light beams to the document-contact face; and
- a light-guiding member, having a plurality of planes, provided between the light-source unit and the document-contact face and configured to guide the light beams from the plurality of light-emitting elements to the document-contact face, the light-guiding member having a length in the main scanning direction which is defined with the pitch of the plurality of light-emitting elements, and a length of the document-contact face and the light-source unit in the main scanning direction,
- wherein the length of the document-contact face is Wp in the main scanning direction,
- the length of the light-source unit is W1 in the main scanning direction, and
- the length of the light-guiding member is Wg in the main scanning direction,
- to satisfy a relationship Wp<W1<Wg, in which center positions of the document-contact face, the light-guiding member, and the light-source unit in the main scanning direction are matched.

19. The image scanning unit according to claim 18, wherein
- the plurality of planes include a first plane configured to receive the light beams from the plurality of light-emitting elements, and a second plane configured to emit the light beams, and
- the second plane is provided at a predetermined angle with the document-contact face when viewing the light-guiding member from the sub-scanning direction of the document-contact face.

20. An image forming apparatus, comprising:
the image scanning unit as claimed in claim 18.

* * * * *